United States Patent
Ling et al.

(10) Patent No.: US 7,733,968 B2
(45) Date of Patent: Jun. 8, 2010

(54) EVALUATION OF TRANSMITTER PERFORMANCE

(75) Inventors: Fuyun Ling, San Diego, CA (US); Durk L. Van Veen, Santee, CA (US); Murali Ramaswamy Chari, San Diego, CA (US); Thomas Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 884 days.

(21) Appl. No.: 11/361,085

(22) Filed: Feb. 22, 2006

(65) Prior Publication Data

US 2007/0071122 A1 Mar. 29, 2007

Related U.S. Application Data

(60) Provisional application No. 60/721,372, filed on Sep. 27, 2005, provisional application No. 60/734,885, filed on Nov. 8, 2005.

(51) Int. Cl.
*H04L 27/28* (2006.01)
(52) U.S. Cl. ...................................... 375/260
(58) Field of Classification Search ................ 375/269, 375/130, 219, 340, 346.232; 370/206, 210
See application file for complete search history.

(56) References Cited

U.S. PATENT DOCUMENTS

| | | | |
|---|---|---|---|
| 3,747,065 A | 7/1973 | Gibson | |
| 5,054,036 A | 10/1991 | Brownlie et al. | |
| 5,621,767 A | 4/1997 | Brandt et al. | |
| 5,692,098 A | 11/1997 | Kurdziel | |
| 6,275,523 B1 | 8/2001 | Chen et al. | |
| 6,347,071 B1 | 2/2002 | Cupo et al. | |
| 6,636,994 B1 | 10/2003 | Waschura et al. | |
| 6,717,934 B1 | 4/2004 | Kaasila et al. | |
| 7,009,932 B2 | 3/2006 | Matheus et al. | |
| 7,161,896 B1 * | 1/2007 | Hart et al. ................... 370/206 |
| 7,187,646 B2 | 1/2007 | Schramm | |
| 7,231,183 B2 | 6/2007 | Pauli | |

(Continued)

FOREIGN PATENT DOCUMENTS

EP 1052821 11/2000

(Continued)

OTHER PUBLICATIONS

3. M. Ramaswamy, T. Sun, F. Ling, R. Krishnamoorthi and D. van Veen, "Test Receiver for FLO Transmitter," Qualcomm Internal Presentation, Jun., 2005.

(Continued)

*Primary Examiner*—Khai Tran
(74) *Attorney, Agent, or Firm*—Gerald P. Joyce, III

(57) ABSTRACT

Systems and methodologies are described that facilitate monitoring transmitter performance in a wireless communication environment. A signal analyzer can be used to sample the output of a transmitter and the sampled signal can be propagated to a processor. The processor can generate frequency domain channel estimates for the subcarriers. If the transmitted modulation symbols are unknown, the processor can determine the modulation symbols and use the determined modulation symbols to calculate the channel estimates. The channel estimates can be averaged and used to generate various metrics to evaluate the transmitter performance.

52 Claims, 16 Drawing Sheets

U.S. PATENT DOCUMENTS

| | | | |
|---|---|---|---|
| 7,272,109 B2 | 9/2007 | Webster et al. | |
| 7,298,691 B1 | 11/2007 | Yonge, III et al. | |
| 7,315,582 B2 | 1/2008 | Chouly et al. | |
| 7,321,559 B2 | 1/2008 | Etter et al. | |
| 7,328,389 B2 | 2/2008 | Murakami et al. | |
| 7,392,368 B2 | 6/2008 | Khan et al. | |
| 7,583,584 B2 | 9/2009 | Wang et al. | |
| 2004/0073773 A1 | 4/2004 | Demjanenko | |
| 2005/0094746 A1 | 5/2005 | Akita | |
| 2006/0109919 A1* | 5/2006 | Nieto | 375/260 |
| 2007/0286317 A1 | 12/2007 | Stentiford et al. | |

FOREIGN PATENT DOCUMENTS

| | | |
|---|---|---|
| EP | 1158717 | 11/2001 |
| EP | 1176750 | 1/2002 |
| EP | 1434381 | 6/2004 |
| EP | 1052821 | 3/2005 |

OTHER PUBLICATIONS

4. J.H. Stott, M.A., "The Effects of Frequency Errors in OFDM," BBC Research and Development Report, 1995/15.

5. T. Sun, "Confidence Level of Estimated Noise," Qualcomm Internal Memo, Jun. 2005.

Keller T et al.: "Blind-detection assisted sub-band adaptive turbo-coded OFDM schemes", Vehicular Technology Conference, 1999 IEEE 49th Houston, TX, USA May 16-20,1999.

International Search Report - PCT/US06/037568 - International Search Authority - European Patent Office - Mar. 12, 2007.

Written Opinion - PCT/US06/037568 - International Search Authority - European Patent Office - Mar. 12, 2007.

International Search Report - PCT/US06/037568 - International Search Authroity - European Patent Office - Mar. 12, 2007.

Written Opinion - PCT/US06/037568 - International Search Authroity - European Patent Office - Mar. 12, 2007.

International Preliminary Report on Patentability - PCT/US06/037568 - International Search Authority - the International Bureau of WIPO - Geneva, Switzerland - Apr. 1, 2008.

* cited by examiner

EVALUATION OF TRANSMITTER PERFORMANCE

CROSS-REFERENCE TO RELATED APPLICATIONS

This application claims the benefit of U.S. Provisional Application Ser. No. 60/721,372 entitled "A METHOD FOR MEDIAFLO TRANSMITTER QUALIFICATION," filed on Sep. 27, 2005, the entirety of which is incorporated herein by reference. This application is also related to U.S. Provisional Application Ser. No. 60/734,885 entitled "HALF INTERLACE BASED SEQUENCE DETECTION ALGORITHM FOR MEDIAFLO TEST RECEIVER," filed on Nov. 8, 2005, and assigned to the assignee hereof and hereby expressly incorporated by reference herein.

BACKGROUND

I. Field

The following description relates generally to wireless communications, and, amongst other things, to evaluating transmitter performance.

II. Background

Wireless networking systems have become a prevalent means by which a majority of people worldwide has come to communicate. Wireless communication devices have become smaller and more powerful in order to meet consumer needs and to improve portability and convenience. Consumers have become dependent upon wireless communication devices such as cellular telephones, personal digital assistants (PDAs) and the like, demanding reliable service and expanded areas of coverage.

A typical wireless communication network (e.g., employing frequency, time, and code division techniques) includes one or more base stations that provide a coverage area and one or more mobile (e.g., wireless) user devices that can transmit and receive data within the coverage area. A typical base station can simultaneously transmit multiple data streams for broadcast, multicast, and/or unicast services, wherein a data stream is a stream of data that can be of independent reception interest to a user device. A user device within the coverage area of that base station can be interested in receiving one, more than one or all the data streams carried by the composite stream. Likewise, a user device can transmit data to the base station or another user device.

Forward Link Only (FLO) technology has been developed by an industry group of wireless communication service providers to utilize the latest advances in system design to achieve the highest-quality performance. FLO technology is intended for a mobile multimedia environment and is suited for use with mobile user devices. FLO technology is designed to achieve high quality reception, both for real-time content streaming and other data services. FLO technology can provide robust mobile performance and high capacity without compromising power consumption. In addition, the technology reduces the network cost of delivering multimedia content by decreasing the number of base station transmitters that are needed to be deployed. Furthermore,. FLO technology based multimedia multicasting is complimentary to the wireless operators' cellular network data and voice services, delivering content to the same mobile devices.

Base station transmitter performance is vital to the overall performance of a wireless system. In particular, in a wireless system utilizing FLO technology, which can utilize fewer transmitters, the performance of each transmitter is critical. Therefore, transmitter performance should be carefully monitored before and after installation.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with monitoring transmitter performance in a wireless communication environment. A signal analyzer can be used to sample the output of a transmitter and the sampled signal can be propagated to a processor. The processor can generate frequency domain channel estimates for the subcarriers. If the transmitted modulation symbols are unknown, the processor can determine the modulation symbols and use the determined modulation symbols to calculate the channel estimates. The channel estimates for each subcarrier can be averaged to get an accurate value and used to generate various metrics to evaluate the transmitter performance.

According to a related aspect, a method for evaluating transmitter performance for a wireless communication environment can comprise generating a frequency domain channel estimate for each subcarrier for every orthogonal frequency division multiplexing (OFDM) symbol in a unit of data of a transmitter signal, determining an average frequency domain channel estimate for each of the subcarriers and generating at least one metric indicative of transmitter performance based upon the average frequency domain channel estimate for each of the subcarriers. The method can further comprise determining a modulation symbol for each of the subcarriers, where the modulation symbol is utilized in generating the frequency domain channel estimates and the at least one metric. In addition, the method can comprise partitioning a complex plane into a plurality of regions, each region corresponding to a possible modulation symbol and selecting the region in which a point representing the transmitter signal is located, where the modulation symbol for the subcarrier is the possible modulation symbol corresponding to the selected region. Furthermore, the method can comprise determining a modulation type for a subset of the subcarriers having a consistent modulation type using majority vote and reevaluating the modulation symbol for each subcarrier in the subset if the modulation symbol is inconsistent with the majority modulation type. The method can comprise generating a coarse frequency domain channel estimate for each of the plurality of subcarriers. The method can also comprise separating the transmitter signal into a set of segments, each segment including at least one symbol, and performing phase correction for each segment.

According to yet another aspect, an apparatus for evaluating transmitter performance in a wireless communication environment can comprise a signal analyzer, a processor and a memory. The signal analyzer samples an RF signal from a transmitter. The processor calculates a frequency domain channel estimate for each subcarrier for every symbol in a superframe of a transmitter signal, calculates the average of the frequency domain channel estimates for each of the subcarriers and generates at least one transmitter metric based at least in part upon the average frequency domain channel estimates. The memory is coupled to the processor and stores information related to the symbols. In addition, the processor can determine a modulation symbol for each of the subcarriers, where the modulation symbol can be utilized in generating the frequency domain channel estimates and the at least one metric. The processor can also determine a modulation type based on a majority vote for a subset of subcarriers that has a consistent modulation type and reevaluate the modulation symbol for each subcarrier in the subset if the modulation symbol of the subcarrier is inconsistent with the modulation type of the subset. Additionally, the memory can store a plurality of regions of a constellation diagram, each region corresponding to a possible modulation symbol and the processor can select the region in which a constellation point corresponding to the transmitter signal is located for each subcarrier, where the modulation symbol for the subcarrier is the possible modulation symbol corresponding to the selected region. The processor can also generate a coarse channel estimate for each pilot subcarrier, perform linear interpolation to generate coarse channel estimates for each subcarrier located between pilot subcarriers and perform linear extrapolation to generate coarse channel estimates for subcarriers not located between pilot subcarriers. Furthermore, the processor can divide the transmitter signal into segments, each segment including at least one symbol, and perform phase correction for each segment.

According to another aspect, an apparatus for evaluating transmitter performance for a wireless communication environment can comprise a means for means for generating a frequency domain channel estimate for each subcarrier for every OFDM symbol in a unit of data of a transmitter signal, means for determining an average frequency domain channel estimate for each of the subcarriers and means for generating at least one metric indicative of transmitter performance based at least in part upon the average frequency domain channel estimate for each of the subcarriers. In addition, the apparatus can comprise means for determining a modulation symbol for each of the subcarriers, the modulation symbol is utilized in generating the frequency domain channel estimates and the at least one metric. The apparatus can further comprise means for determining a modulation type based on a majority vote for a subset of the subcarriers that has a consistent modulation type and means for reevaluating the modulation symbol for each subcarrier in the subset of the subcarriers if the modulation symbol of the subcarrier is inconsistent with the modulation type. Furthermore, means for determining a modulation symbol can comprise means for determining a distance between a point in a complex plane corresponding to the transmitter signal for one of the subcarriers and a point in the complex plane corresponding to a possible modulation symbol for at least one possible modulation symbol and means for selecting the possible modulation symbol corresponding to the modulation symbol closest to the signal point, where the modulation symbol for the subcarrier is the selected possible modulation symbol. The apparatus can further comprise means for generating a coarse channel estimate for each pilot subcarrier and means for performing linear interpolation to generate the coarse channel estimate for each of the subcarriers located between pilot subcarriers and linear extrapolation to generate the coarse channel estimate for each subcarrier not located between pilot subcarriers. The apparatus can also comprise means for separating the transmitter signal into a set of segments, each segment including at least one symbol and means for performing phase correction for each segment.

Yet another aspect relates to a computer-readable medium having stored thereon computer-executable instructions for generating a frequency domain channel estimate for each of a plurality of subcarriers for every symbol in a unit of data of a transmitter signal, determining an average frequency domain channel estimate for each of the plurality of subcarriers and generating at least one metric indicative of transmitter performance based at least in part upon the average frequency domain channel estimate for each of the plurality of subcarriers. The instructions can further comprise instructions for determining a modulation symbol for each of the plurality of subcarriers, where the modulation symbol is utilized in generating the frequency domain channel estimates and the at least one metric. The computer readable-medium further comprising instructions for determining a modulation type based on a majority vote for a subset of the subcarriers that have a consistent modulation type and reevaluating the modulation symbol for each subcarrier in the subset if the modulation symbol of the subcarrier is inconsistent with the modulation type. Furthermore, the computer readable medium can comprise instructions for partitioning a complex plane into a plurality of regions, each region corresponding to a possible modulation symbol and selecting the region in which a point corresponding to the transmitter signal for a subcarrier is located, the modulation symbol for the subcarrier is the possible modulation symbol corresponding to the selected region. In addition, the computer readable-medium can comprise instructions for generating a coarse frequency domain channel estimate for each pilot subcarrier, interpolating a coarse frequency domain channel estimate for each of the subcarriers located between pilot subcarriers and extrapolating a coarse frequency domain channel estimate for the subcarriers not located between pilot subcarriers. The computer readable-medium can further comprise instructions for separating the transmitter signal into a set of segments, each segment including at least one symbol and performing phase correction for each segment.

Yet another aspect relates to a processor that executes instructions for evaluating transmitter performance for a wireless communication environment, the instructions can comprise generating a frequency domain channel estimate for each of a plurality of subcarriers for every symbol in a unit of data of a transmitter signal, determining an average frequency domain channel estimate for each of the plurality of subcarriers and generating at least one metric indicative of transmitter performance based at least in part upon the average frequency domain channel estimate for each of the plurality of subcarriers. The instructions can also comprise determining a modulation symbol for each of the plurality of subcarriers, the modulation symbol is utilized in generating the frequency domain channel estimates and the at least one metric. Additionally, the instructions can comprise determining a modulation type based on a majority vote for a subset of the subcarriers that has a consistent modulation type and reevaluating the modulation symbol for each subcarrier in the subset if the modulation symbol of the subcarrier is inconsistent with the modulation type. The instructions can further comprise determining a distance between a point in a complex plane corresponding to the transmitter signal for one of the plurality of subcarriers and a point in the complex plane corresponding to a possible modulation symbol for at least one possible modulation symbol and selecting the possible modulation symbol corresponding to the modulation symbol point closest to the signal point, where the modulation symbol for the subcarrier is the selected modulation symbol. The instructions can also comprise generating a coarse frequency domain channel estimate for each pilot subcarrier of the plurality of subcarriers, interpolating a coarse frequency domain channel estimate for each of the plurality of subcarriers located between the pilot subcarriers and extrapolating a coarse frequency domain channel estimate for each of the plurality of subcarriers not located between the pilot subcarriers. In addition, the instructions can comprise seperating the transmitter signal into a set of segments, each segment including at least one symbol and performing phase correction for each segment.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
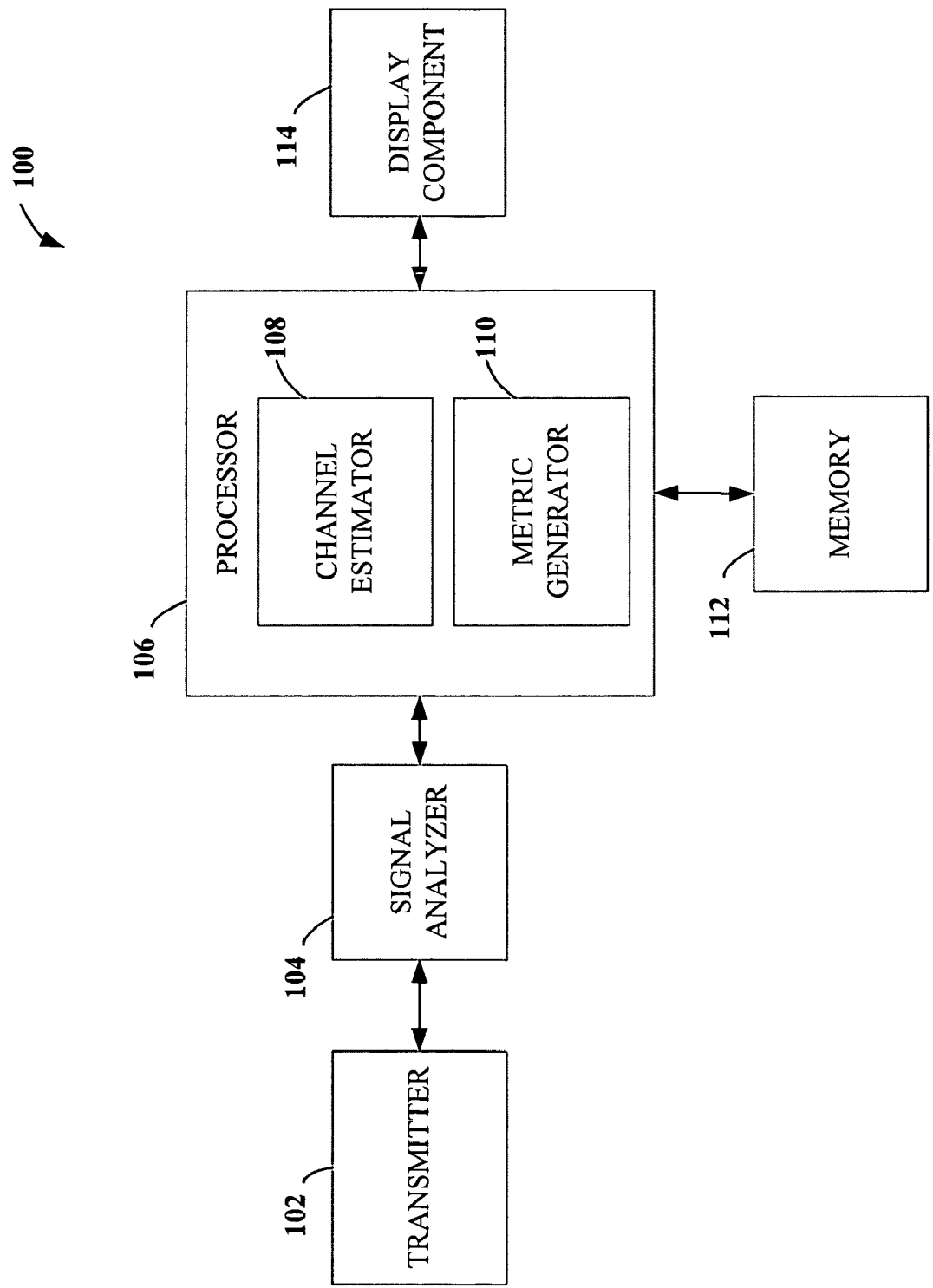
FIG. 1 is an illustration of a transmitter evaluation system according to one or more aspects presented herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a user device. A user device can also be called a system, a subscriber unit, subscriber station, mobile station, mobile device, remote station, access point, base station, remote terminal, access terminal, user terminal, terminal, user agent, or user equipment (UE). A user device can be a cellular telephone, a cordless telephone, a Session Initiation Protocol (SIP) phone, a wireless local loop (WLL) station, a PDA, a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

The FLO wireless system has been designed to broadcast real time audio and video signals, as well as non-real time services. The respective FLO transmission is carried out utilizing tall, high power transmitters to ensure wide coverage in a given geographical area. It is common to deploy multiple transmitters in markets to ensure that the FLO signal reaches a significant portion of the population in a given market.

Typically, FLO technology utilizes OFDM. Frequency division based techniques, such as OFDM, typically separate the frequency spectrum into distinct channels by splitting the frequency spectrum into uniform chunks of bandwidth. For example, the frequency spectrum or band allocated for wireless cellular telephone communication can be split into 30 channels, each of which can carry a voice conversation or, for digital service, digital data. Each channel can be assigned to only one user device or terminal at a time. OFDM effectively partitions the overall system bandwidth into multiple orthogonal frequency channels. An OFDM system may use time and/or frequency division multiplexing to achieve orthogonality among multiple data transmissions for multiple terminals. For example, different terminals may be allocated different channels, and the data transmission for each terminal may be sent on the channel(s) allocated to this terminal. By using disjoint or non-overlapping channels for different terminals, interference among multiple terminals may be avoided or reduced, and improved performance may be achieved.

Base station transmitter performance is vital to the overall performance of a wireless system, particularly a wireless system utilizing FLO technology. Therefore, a system and/or method for testing and evaluating transmitters should be accurate and cost-effective. Transmitters can be tested at the factory or before installation to qualify the transmitters for installation. In addition, transmitters can be tested or monitored after installation to ensure continued transmitter performance. The system and methods described herein can be used to evaluate transmitter performance in wireless environments including, but not limited to, a wireless environment broadcasting FLO, digital multimedia broadcasting (DMB), digital video broadcasting (DVB), DVB-H, DVB-T, DVB-S or DVB-S2 signals.

Referring now to FIG. 1, a transmitter evaluation system 100 in accordance with various aspects presented herein is illustrated. System 100 can include a signal analyzer 104 that can be used to sample a signal generated by a transmitter 102. By using signal analyzer 104 rather than a receiver to receive the signal, system 100 can eliminate the receiver as a possible source of additional noise and distortion. System 100 can also include a processor 106 capable of processing the signal captured by signal analyzer 104 and generating metrics to evaluate the performance of transmitter 102. Processor 106 can include a channel estimator 108 that can be used to generate frequency domain channel estimates for each subcarrier. Processor 106 can also include a metric generator 110 that generates a metric, such as the modulation error rate (MER), to evaluate performance of transmitter 102. The metric produced by metric generator 110 can based upon the frequency domain channel estimates produced by channel estimator 108. System 100 can also include a memory 112 connected to processor 106 that data relating to transmitter performance evaluation (e.g., symbol data and metric data). In addition, system 100 can include a display component 114 to allow a user to monitor transmitter performance through visual feedback generated by the processor.

Processor 106 can provide various types of user interfaces for display component 112. For example, processor 106 can provide a graphical user interface (GUI), a command line interface and the like. For example, a GUI can be rendered that provides a user with a region to view transmitter information. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed.

In an example, a command line interface can be employed. For example, the command line interface can prompt (e.g., by a text message on a display and an audio tone) the user for information by providing a text message or alert the user that the transmitter performance is outside of predetermined bounds. It is to be appreciated that the command line interface can be employed in connection with a GUI and/or application program interface (API). In addition, the command line interface can be employed in connection with hardware (e.g., video cards) and/or displays (e.g., black and white, and EGA) with limited graphic support, and/or low bandwidth communication channels.

In addition, the evaluation system can generate an alert to notify users if the transmitter performance is outside of an acceptable range. The alert can be audio, visual or any other form intended to attract the attention of a user. The evaluation system can include a predetermined set of values indicating the boundaries of the acceptable range. Alternatively, users may dynamically determine the boundaries. In addition, the evaluation system can generate an alert based upon a change in transmitter performance.

Figure 2:
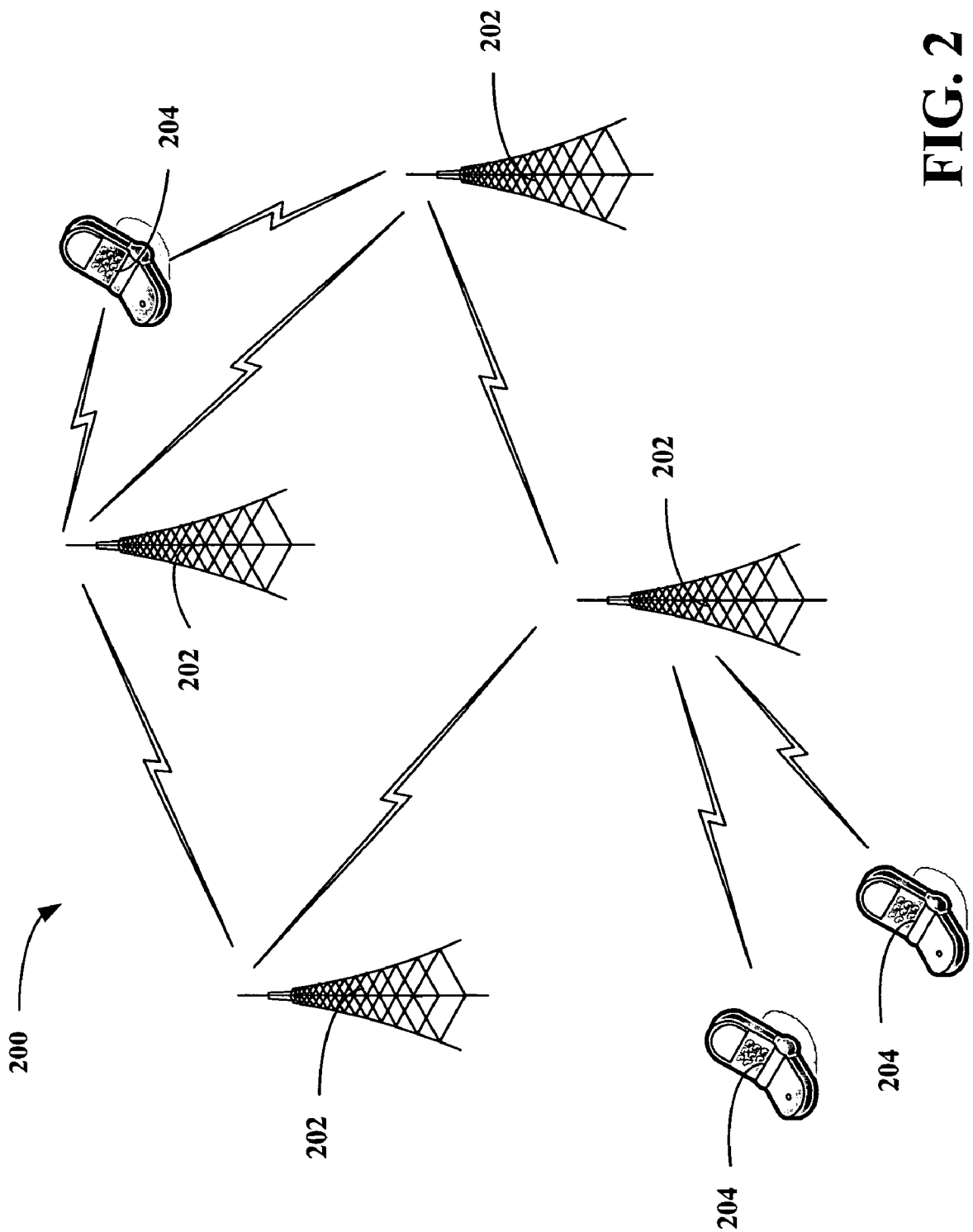
FIG. 2 is an illustration of a wireless communication system according to one or more aspects presented herein.

Referring now to FIG. 2, a wireless communication system 200 in accordance with various embodiments presented herein is illustrated. System 200 can comprise one or more base stations 202 in one or more sectors that receive, transmit, repeat, etc., wireless communication signals to each other and/or to one or more mobile devices 204. A base station may be a fixed station used for communicating with the terminals and may also be referred to as an access point, a Node B, or using other terminology. Each base station 202 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Mobile devices 204 can be, for example, cellular phones, smart phones, laptops, handheld communication devices, handheld computing devices, satellite radios, global positioning systems, PDAs, and/or any other suitable device for communicating over wireless system 200. In addition, each mobile device 204 can comprise one or more transmitter chains and a receiver chains, such as used for a multiple input multiple output (MIMO) system. Each transmitter and receiver chain can comprise a plurality of components associated with signal transmission and reception (e.g., processors, modulators, multiplexers, demodulators, demultiplexers, antennas, etc.), as will be appreciated by one skilled in the art.

Figure 3:
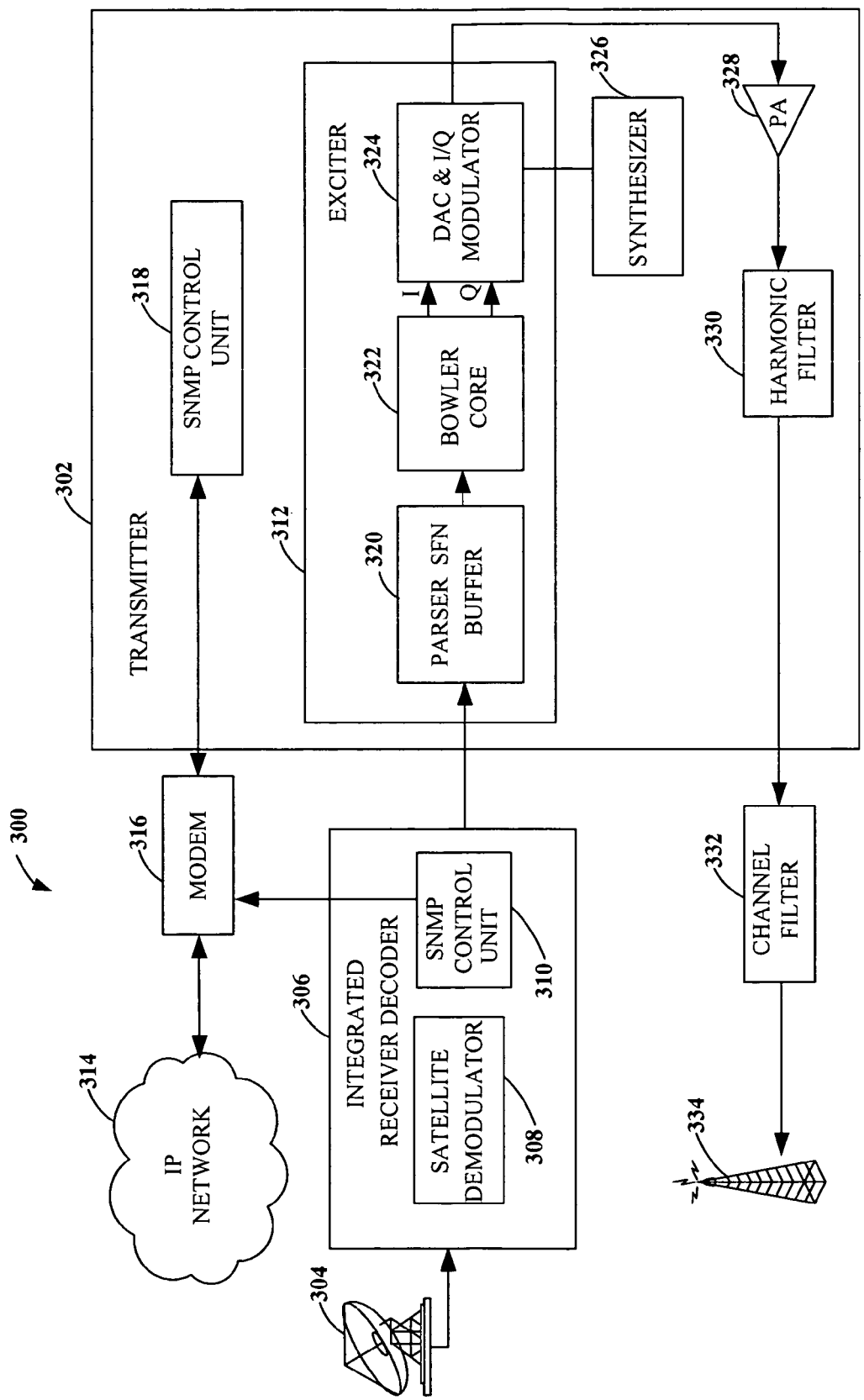
FIG. 3 is an illustration of a wireless communication system according to one or more aspects presented herein.

FIG. 3 is an illustration of a wireless communication system 300. System 300 includes a transmitter 302 that can receive data for transmission from a communication satellite system 304. Signals from satellite system 304 can be propagated through an integrated receiver decoder 306 that can include a satellite demodulator 308 and a simple network management protocol (SNMP) control unit 310. Signal data from integrated receiver decoder 306 can be input into an exciter 312 within transmitter 302. In addition, transmitter 302 can be connected to an Internet provider (IP) network 314 through a modem 316. Modem 316 can be connected to a SNMP control unit 318 within transmitter 302. Exciter 312 can include a parser and single frequency network (SFN) buffer 320, a bowler core 322 and a digital to analog converter (DAC) and I/Q modulator 324. Signal data from satellite system 304 can be parsed and stored in parser and SFN buffer 320. Bowler core 322 generates complex number representing the signal data, passing the signal data to DAC and I/Q modulator 324 as in-phase (I) and quadrature (Q) components. DAC and I/Q modulator 324 can utilize a synthesizer 326 to process the signal data and produce an analog, radio frequency (RF) signal. After the data is converted to analog, the resulting RF signal data can be passed to a power amplifier 328 and through a harmonic filter 330. In addition, the data can be passed through a channel filter 332 prior to transmission by antenna 334.

To evaluate transmitter performance, the RF signal data produced by exciter 312 can be monitored. Possible sources of transmitter error or noise include up-sampling, digital to analog conversion and RF conversion. The signal data can be sampled at the output of the exciter and at the output of the channel filter, such that the RF signal can be sampled either before or after power amplification and filtering. If the signal is sampled after amplification, the signal should be corrected for power amplification nonlinearity.

Figure 4:
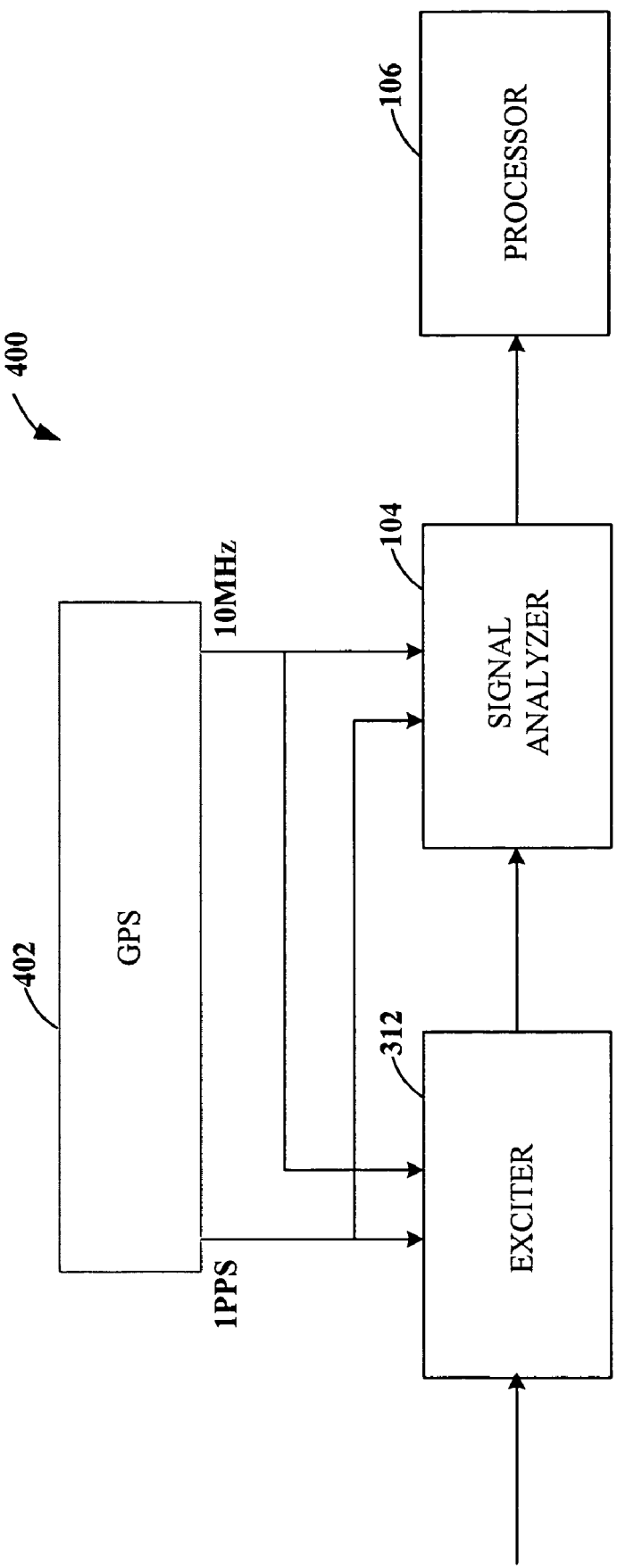
FIG. 4 is an illustration of a transmitter evaluation system according to one or more aspects presented herein.

Referring now to FIG. 4, a transmitter evaluation system 400 connected to a transmitter system exciter 312 is illustrated. Signals from a global positioning system (GPS) receiver 402 can be used to synchronize transmitter exciter 312 and signal analyzer 104. An external 10 Megahertz clock from GPS receiver 402 can be fed into both exciter 312 and signal analyzer 104 to act as a common clock reference. To synchronize the start of sampling by signal analyzer 104 to the beginning of the superframe of the RF signal data output by exciter 312, GPS 402 can transmit a 1 pulse per second (PPS) signal to exciter 312 for synchronization and to signal analyzer 104 to trigger the start of sampling. Signal analyzer 104 can generate digital samples of exciter analog output waveform at a rate that is synchronous to the baseband chip rate of the transmitted signal. Sampled data is then fed into processor 106. Processor 106 can be implemented using a general-purpose processor or a processor dedicated to analyzing transmitter data. Use of a general-purpose processor can reduce the cost of transmitter evaluation system 400. Signal analyzer 104 can be configured to run in floating point mode to avoid quantization noise.

Figure 5:
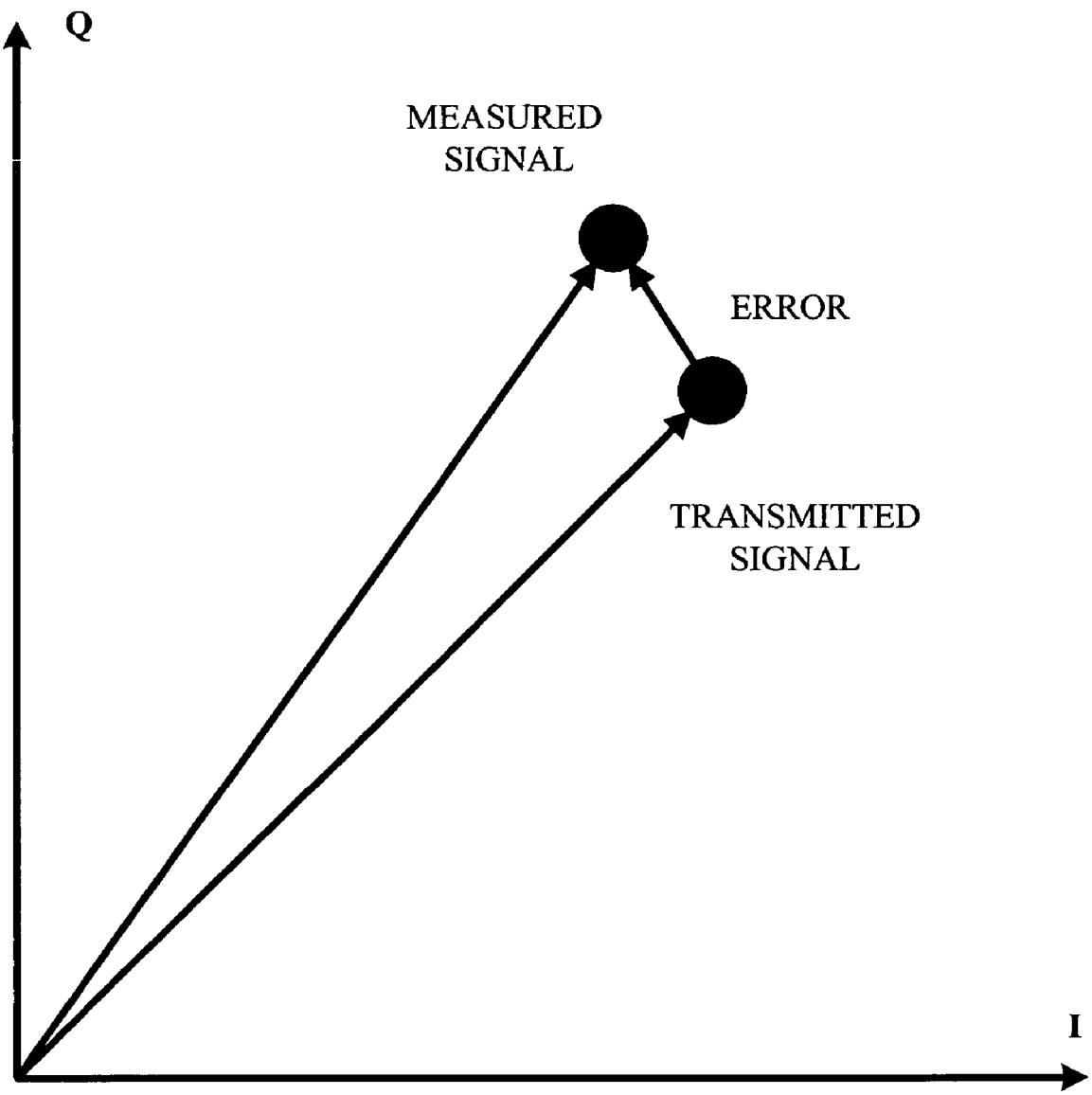
FIG. 5 is a constellation diagram illustrating the difference between measured signal and transmitted signal.

Referring now to FIG. 5, a constellation diagram illustrating the difference between measured or received signal and transmitted signal is shown. The axes of the constellation diagram represent the real and imaginary components of complex numbers, referred to as the in phase or I-axis and the quadrature or Q-axis. The vector between the measured signal constellation point and the transmitted signal constellation point represents the error, which can include digital to analog conversion inaccuracies, power amplifier nonlinearities, in-band amplitude ripple, transmitter IFFT quantization error and the like.

The transmitter evaluation system can generate one or more metrics to evaluate the performance of the transmitter. Metrics generated by processor include, but are not limited to, modulation error ratio (MER), group delay or channel frequency response. In particular, MER measures the cumulative impact of flaws within the transmitter. MER for a subcarrier is equivalent to signal to noise ratio (SNR) for a subcarrier. MER can be generated using the following equation:

$$MER(dB) = 10 \log \frac{\frac{1}{N} \sum_1^N (I^2 + Q^2)}{\frac{1}{N} \sum_1^N (\Delta I^2 + \Delta Q^2)}$$

Here, I is the in phase value of the measured constellation point, Q is the quadrature value of the measured constellation point and N is the number of subcarriers. $\Delta I$ is the difference between the in phase values of the transmitted and measured signals and $\Delta Q$ is the difference between the quadrature values of the transmitted and measured signals.

Referring to FIGS. 6-10, 12 and 13, methodologies relating to evaluating transmitter performance in wireless communication systems are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more embodiments.

Figure 6:
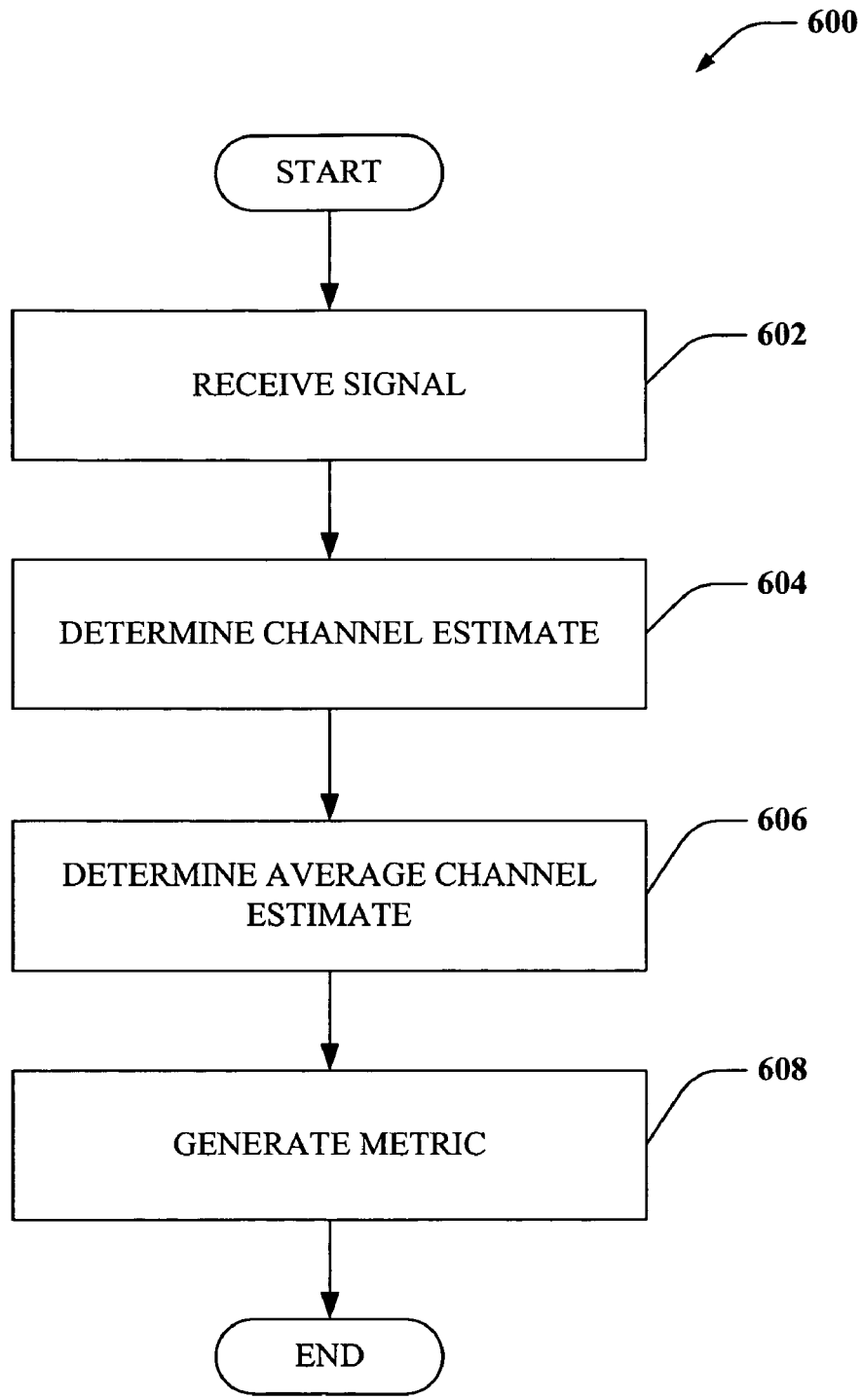
FIG. 6 illustrates a methodology for evaluating a transmitter in accordance with one or more aspects presented herein.

Referring now to FIG. 6, a methodology 600 for processing RF signal data received from a transmitter and evaluating transmitter performance is illustrated. Typically, transmitters broadcast real time scheduled data streams in superframes. A superframe can include a group of frames (e.g., 16 frames) where a frame is a logical unit of data.

At 602, the signal is received or sampled from the transmitter. The received signal can be written as follows:

$$Y_k = H_k \cdot P_k + N_k$$

Here, $H_k$ is the channel of a subcarrier, k. A known modulation symbol, $P_k$, can be transmitted on the subcarrier k. Complex additive white Gaussian noise (AWGN) with a zero mean and a variance of $\sigma^2$ can be represented by $N_k$.

The possible modulation types for the subcarriers can include, but are not limited to, quadrature phase-shift keying (QPSK), layered QPSK with an energy ratio of 6.25 (ER6.25), 16 QAM (quadrature amplitude modulation) and layered QPSK with energy ratio of 4.0 (ER4). When analyzed based upon the constellation point of view, the layered QPSK with energy ratio 4.0 is identical to that of 16 QAM. Constellation point of view, as used herein, refers to utilization of constellation diagrams to represent digital modulation schemes in the complex plane. Modulation symbols can be represented as constellation points on a constellation diagram.

An initial frequency domain channel estimate for a subcarrier can be determined at 604. An initial channel estimate for each subcarrier can be obtained by dividing the received signal $Y_k$ by a known symbol, $P_k$. Selected symbols can be transmitted, such that the symbols are known for the purpose of performance evaluation. The initial frequency domain channel estimate for each subcarrier, k, of every OFDM symbol, l, within a superframe, can be represented as follows:

$$Z_{k,l} = Y_{k,l} / P_{k,l} = H_{k,l} + \frac{N_{k,l} \cdot P^*_{k,l}}{|P_{k,l}|^2}$$

Here, $Z_{k,l}$ is an initial channel estimate for subcarrier k and OFDM symbol l.

An average channel estimate is determined at 606. The channel estimate $Z_{k,l}$ of subcarrier can be refined by averaging over the entire superframe, such that:

$$\hat{H}_k = H_k + \frac{1}{L} \sum_{l=0}^{L-1} \frac{N_{k,l} \cdot P^*_{k,l}}{|P_{k,l}|^2}$$

Here, k is the OFDM symbol index and L is the number of the OFDM symbols in the superframe (e.g., 1188 symbols). Since the variance of the average channel estimate is smaller than the variance of the initial channel estimate, the variance of the average channel estimate can be used to approximate the channel gain of the subcarrier during metric generation.

At 608, a metric for evaluating the transmitter performance is generated. For example, the MER for a subcarrier k can be generated. Assuming that the transmitted symbols are known, noise variance can be estimated as follows:

$$W_{k,m} = Y_{k,m} - \hat{H}_k \cdot X_{k,m} = N_{k,m} - \frac{1}{L}\sum_{l=0}^{L-1} \frac{N_{k,l} \cdot X_{k,l}^*}{|X_{k,l}|^2} \cdot X_{k,m}$$

Here, the $X_{k,m}$ represents the transmitted symbol for subcarrier k. It can be shown that the in-phase and quadrature components of the noise, $W_k$, is approximately:

$$N\left(0, \left(1-\frac{1}{L}\right)\frac{\sigma^2}{2}\right)$$

if random variable $B_k$ is the estimated noise variance, such that:

$$B_k = \frac{1}{L-1}\sum_{l=1}^{L} W_{k,l}^2$$

and:

$$E(B_k) = \frac{L}{L-1}E(W_k^2) = \sigma^2$$

The MER can be determined based upon the average channel estimate for the subcarrier, the symbol transmitted on the subcarrier and the signal received for the subcarrier. A MER can be calculated based upon the following exemplary equation:

$$MER_k = \frac{E|H_k \cdot P_k|^2}{E|Y_k - H_k \cdot P_k|^2} = \frac{E|H_k|^2 \cdot E|P_k|^2}{E|N_k|^2} \approx \frac{E|\hat{H}_k|^2 \cdot E|P_k|^2}{E(B_k)}$$

Here, $\hat{H}_k$ is the average channel estimate for subcarrier k, $P_k$ is the symbol transmitted on the subcarrier, $Y_k$ is the received signal and $N_k$ is the AWGN. In addition, MER can be calculated by averaging over all of the subcarriers.

Additional metrics can be generated to evaluate transmitter performance. For example metrics can include frequency response and group delay. Group delay of subcarrier k can be calculated as follows:

$$GD_k = -\frac{d\theta}{d\omega}\bigg|_k = -\frac{1}{2\pi}E\left(\frac{\Delta\varphi_{k,k-1}}{\Delta f_{k,k-1}}\right)$$

Here, k=1, . . . ,4000; $\Delta\varphi_{k,k-1}$ is the phase difference between subcarriers k and k−1; and $\Delta f_{k,k-1}$ is the frequency difference between subcarriers k and k−1.

Figure 7:
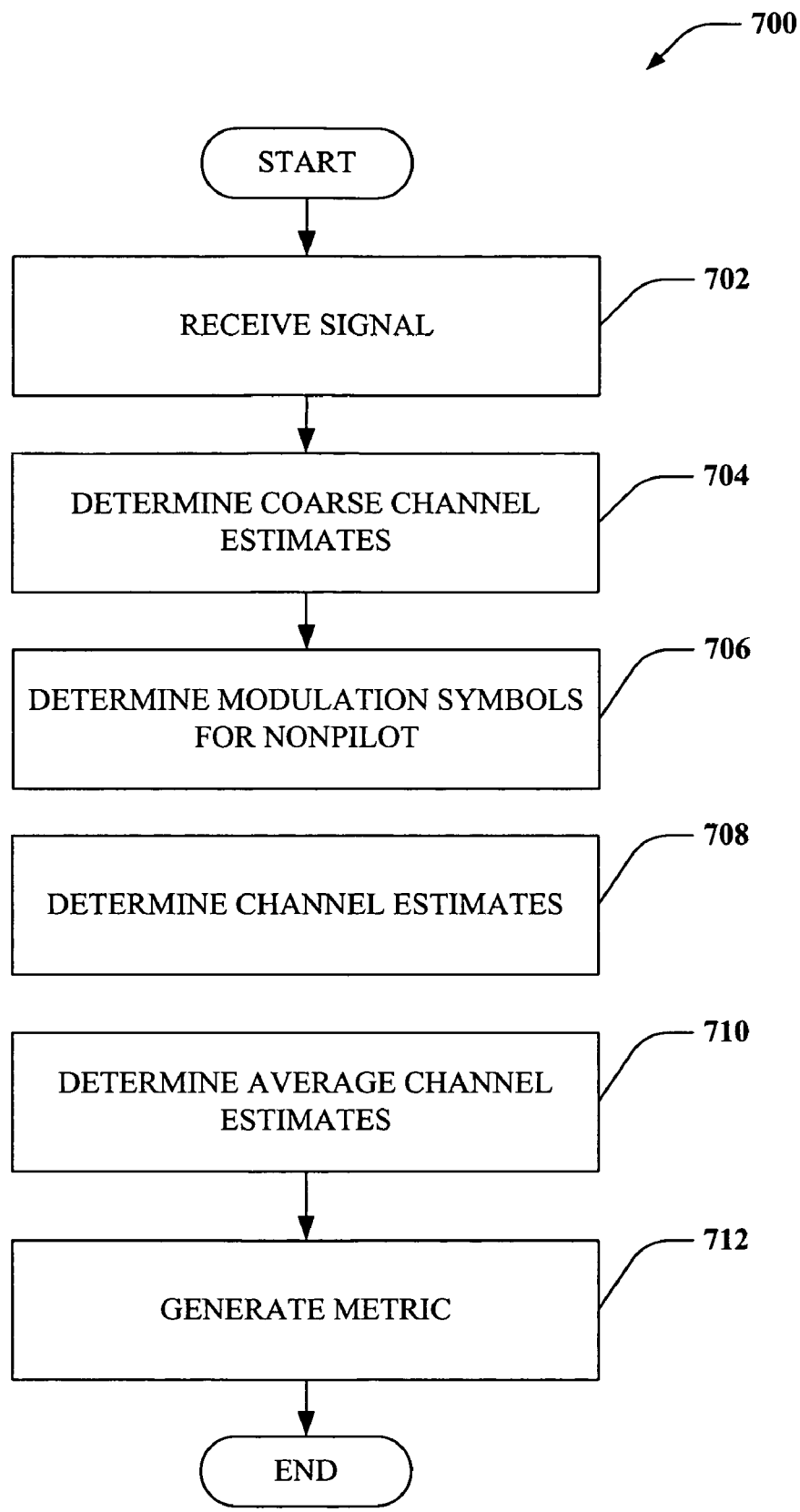
FIG. 7 illustrates a methodology for evaluating a transmitter in accordance with one or more aspects presented herein.

Referring now to FIG. 7, a methodology 700 for evaluating a transmitter where the transmitted symbols are unknown is illustrated. The modulation symbols (e.g., QPSK or 16 QAM symbols) are unknown when real time data streams are transmitted. However, the pilot symbols are known. At 702, a signal is received. A coarse initial channel estimation for the subcarriers can be generated at 704. The coarse initial channel estimation can be performed using the known pilot symbols and linear interpolation and extrapolation, as described with respect to FIG. 8 below. At 706, the modulation symbols for the subcarriers are determined. The modulation symbols can be determined using a constellation diagram as described below with respect to FIGS. 9 and 10. The symbols can be selected based upon the distance between the received signal constellation point and the modulation symbol corresponding to the closest symbol constellation point. Symbol selection is described in further detail below. At 708, an initial frequency domain channel estimate for each subcarrier can be determined. An initial channel estimate for each subcarrier can be obtained by dividing the received signal by the modulation symbol.

At 710, the channel estimates are averaged over the superframe to increase accuracy. The average channel estimate can be determined using the coarse channel estimates, the channel estimates based upon the modulation symbols or both sets of channel estimates. A metric for evaluating the transmitter based at least in part upon the channel estimates can be generated at 712. For example, the MER for each subcarrier can be determined based upon the channel estimates and the modulation symbol, as described in detail above.

Figure 8:
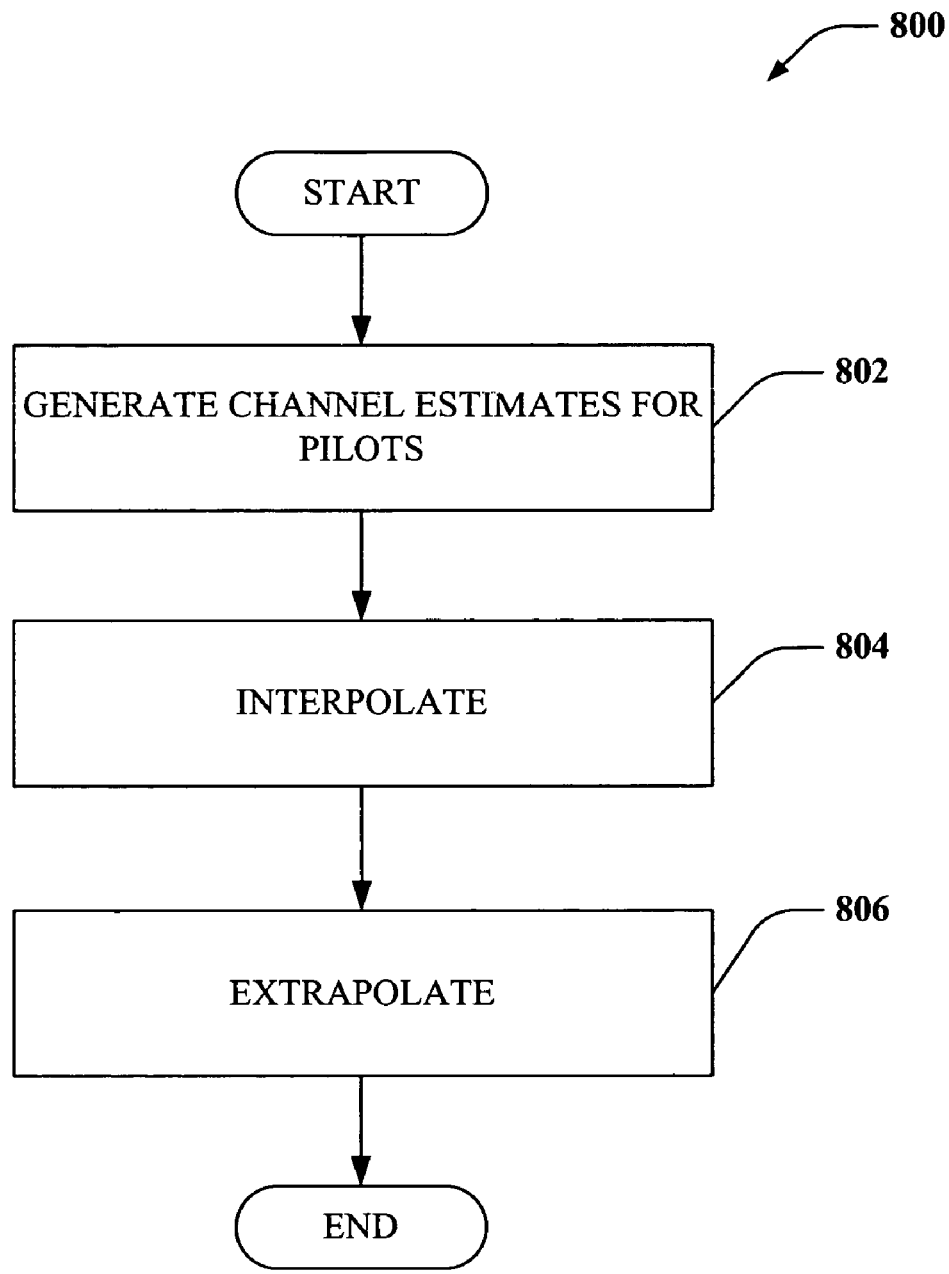
FIG. 8 illustrates a methodology for generating coarse channel estimates in accordance with one or more aspects presented herein.

Referring now to FIG. 8, a methodology 800 for generating coarse channel estimates is illustrated. As discussed in detail above, the received signal can be written as a function of the channel estimate, the symbol for the subcarrier and a noise term, AWGN. In each OFDM symbol, there are a predetermined number of subcarriers carrying pilot symbols known to the receiver, (e.g., 500 subcarriers carrying pilot QPSK symbols). Therefore, the modulation symbols are known for this subset of subcarriers. Consequently, at 802 the channel estimates can be calculated for the pilot subcarriers. At 804, the channel estimates for subcarriers located between two pilot subcarriers can be obtained using linear interpolation. At 806, the channel estimates for subcarriers at the ends of the super frame, and consequently not located between pilot subcarriers, can be obtained using linear extrapolation.

In addition, since there is (2, 6) pattern staggering of pilot symbols for the OFDM symbols of a super frame, both the 500 pilots of the current OFDM symbol and the 500 pilots of the previous OFDM symbol can be used to obtain the frequency domain channel estimation. In such cases, the channel estimates of the pilot subcarriers are generated using the pilot symbols and the channel estimates of the rest of the subcarriers are obtained by linear interpolation or extrapolation.

Figure 9:
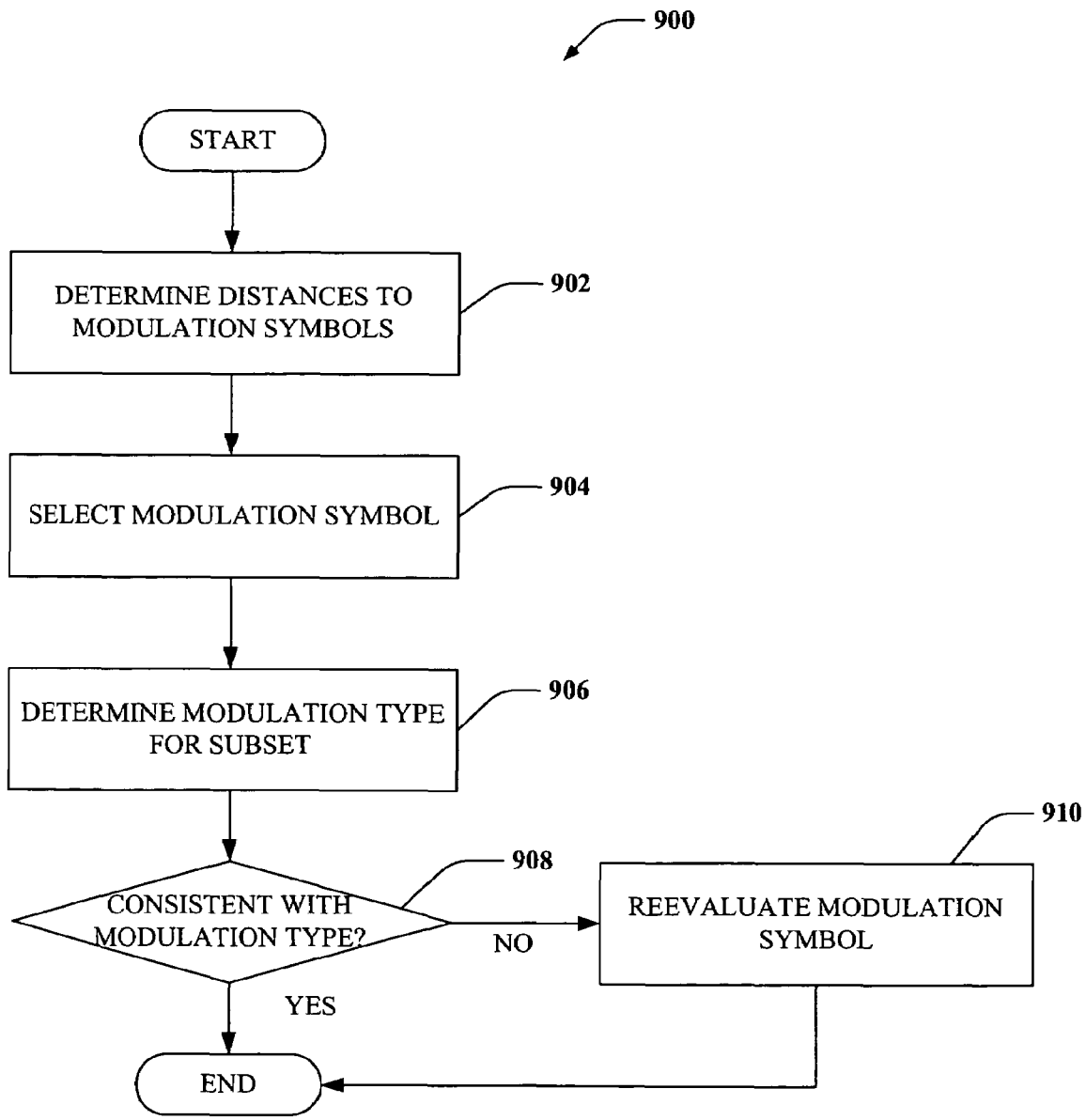
FIG. 9 illustrates a methodology for determining modulation symbols in accordance with one or more aspects presented herein.

Referring now to FIG. 9, a methodology 900 for determining modulation symbols is illustrated. At 902, the distances between the constellation point of the received signal and the constellation points of possible modulation symbols are calculated. For example, the distance between the received signal constellation point and the QPSK constellation point closest the signal constellation point, as well as the distance between the signal constellation point and the 16 QAM constellation point closest to the signal constellation point can be calculated. At 904, the modulation symbol constellation point closest to the signal constellation point is selected as the modulation symbol. To increase accuracy in selection of modulation symbols, the modulation symbol can be compared to the modulation type for a. subset of the subcarriers having a consistent modulation type. A half-interlace is used herein as an example of a subset of subcarriers having a consistent modulation type. However, in the systems and methods discussed herein, the subset of subcarriers having a consistent modulation type is not limited to a half-interlace. Errors in modulation symbol selection can be avoided by checking the modulation symbol for a subcarrier against the modulation type for the subset of subcarriers. The modulation type for the subset of subcarriers can be determined at 906. At 908, it is determined whether the modulation symbol is consistent with the modulation type. If yes, the process terminates. If no, the modulation symbol is reevaluated and a modulation symbol consistent with the modulation type is selected at 910.

Typically, the modulation type remains consistent during a half interlace. In general, the modulation type does not change within an interlace due to constraints in the FLO protocol. An interlace, as used herein is a set of subcarriers (e.g., 500 subcarriers). Consequently, a half-interlace is one half of an interlace (e.g., 250 subcarriers). However, for rate-2/3 layered modulation, the modulation type can be switched to QPSK within an interlace when operating in base-layer only mode. Even under these conditions the modulation type within each half-interlace remains constant. Therefore, the modulation type for each half-interlace can be determined using majority voting. To determine the modulation type for a half-interlace or any other subset of subcarriers having a consistent modulation type, the modulation symbol, and consequently the modulation type, can be determined for each subcarrier within the subset. A majority vote based on the modulation type corresponding to each subcarrier can be used to determine the modulation type for the subset. For example, for a half-interlace including 250 subcarriers, the modulation type for 198 of the subcarriers could be consistent with the QPSK modulation type and the modulation symbols for the remaining 52 subcarriers could be consistent with the 16 QAM modulation type. Since the majority of the subcarriers are detected as QPSK, QPSK would be selected as the modulation type for the half-interlace. The 52 subcarriers that were associated with the 16 QAM modulation type can be reevaluated and reassigned to QPSK modulation symbols based upon their location in the constellation diagram. Comparing the modulation symbol to the modulation type for the half-interlace and reevaluating modulation symbols as needed increases the accuracy of modulation symbol selection.

Figure 10:
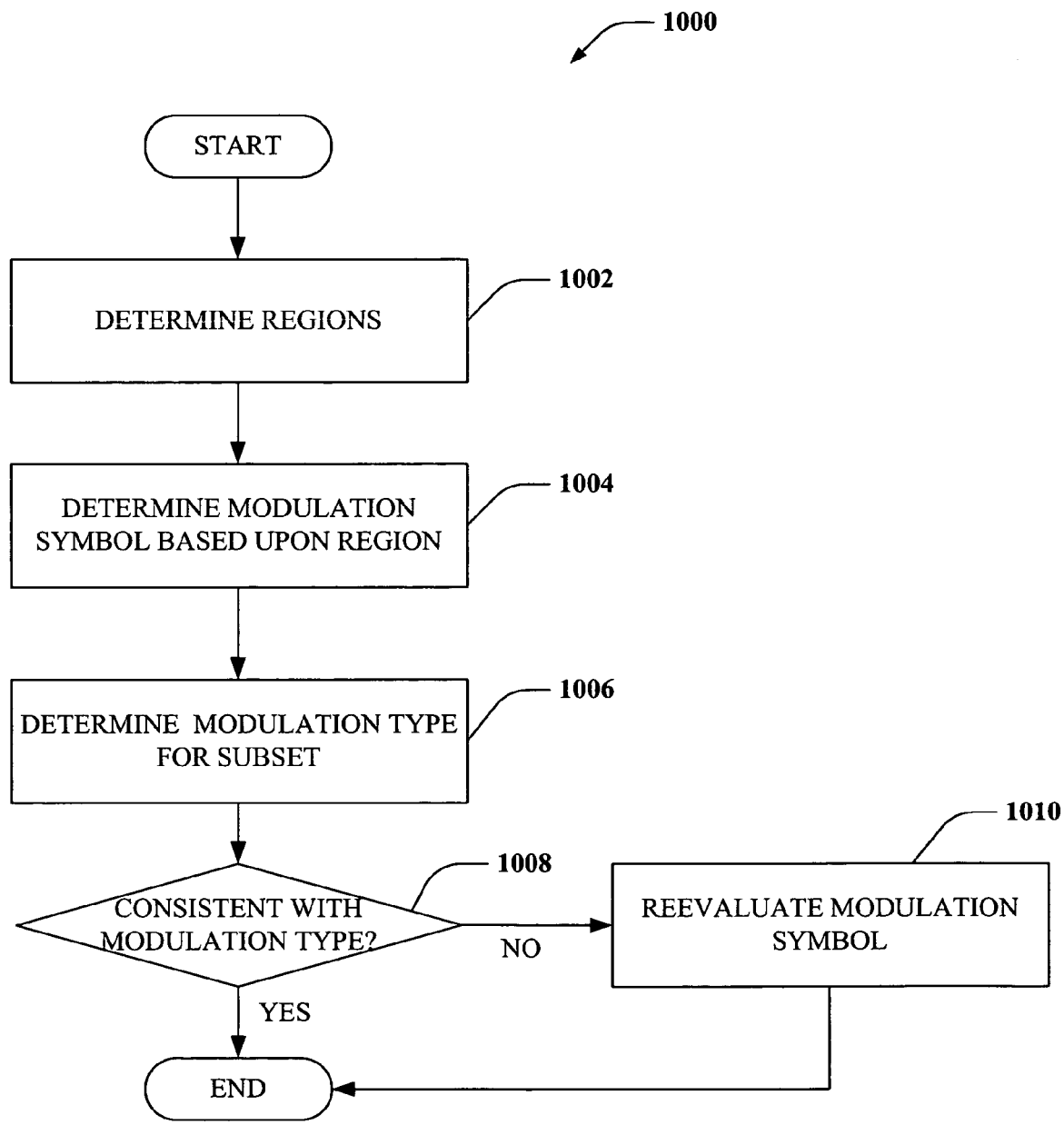
FIG. 10 illustrates a methodology for determining modulation symbols in accordance with one or more aspects presented herein.
Figure 11:
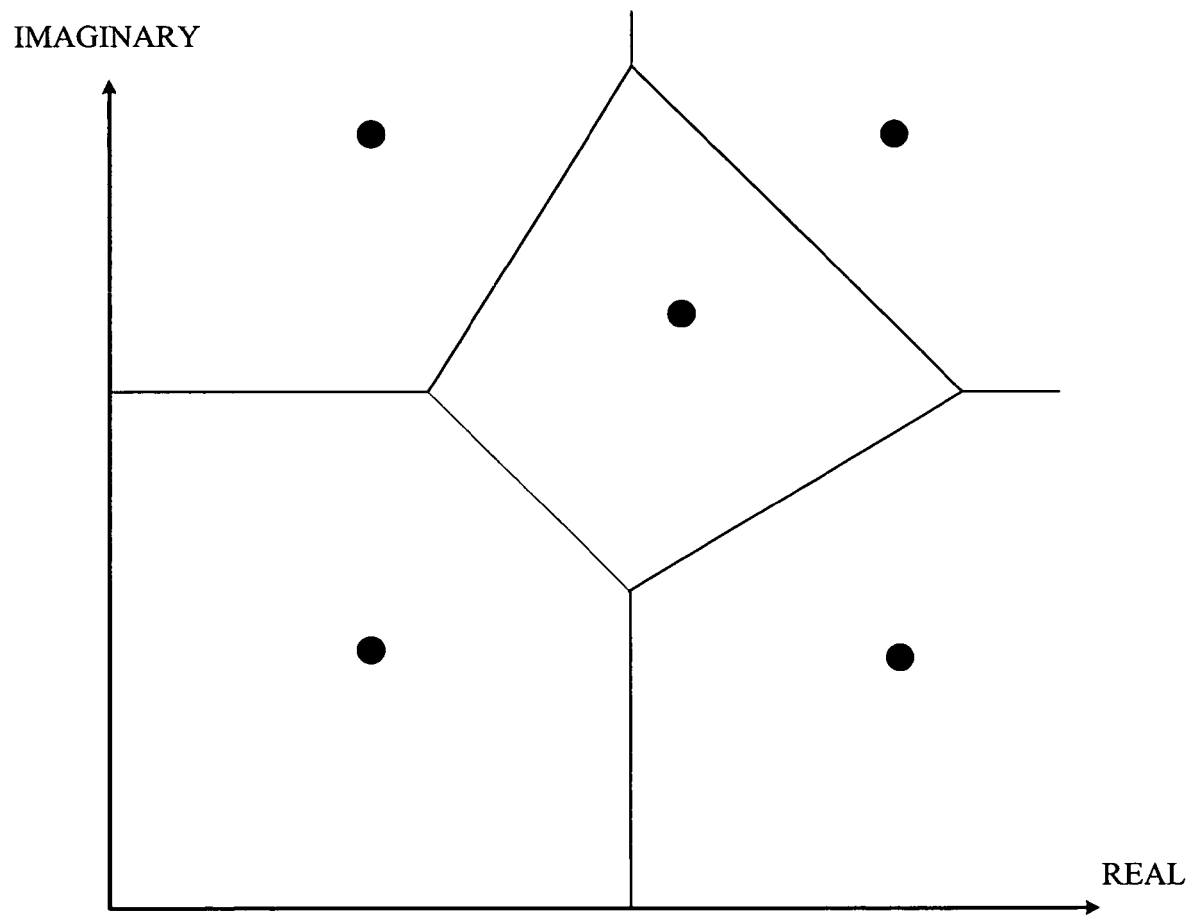
FIG. 11 illustrates the division of a constellation diagram into regions in accordance with one or more aspects presented herein.

Referring now to FIGS. 10-11, a methodology 1000 for determining modulation symbols is illustrated in FIG. 10. At 1002, a constellation diagram including constellation points representing various modulation symbols is divided into a series of regions. Each region is associated with a modulation symbol constellation point. Regions are defined such that every point in each region has the property that the distance of such a point to the constellation point of the region is less than or equal to the distance between such point to the constellation point of any other region. A set of regions covering the first quadrant of the constellation diagram is illustrated in FIG. 11. At 1004, the region in which the received signal constellation point is located is determined. The modulation symbol corresponding to the region in which the received signal constellation point is located is selected as the modulation symbol. The modulation symbol can be checked against the modulation type for a subset of subcarriers having a consistent modulation type (e.g., a half-interlace). The modulation type for the subset of subcarriers can be determined at 1006. At 1008, it is determined whether the modulation symbol is consistent with the modulation type. If yes, the process terminates. If no, the modulation symbol is reevaluated and a modulation symbol consistent with the modulation type is selected at 1010.

The transmitter evaluation systems and methods described herein should also include phase correction, intended to reduce or eliminate error or distortions caused by time frequency offsets. If phase correction is not performed, the channel estimate average can be inaccurate and consequently, the evaluation metrics may be incorrect. Typically, phase correction can be performed prior to the averaging of the channel estimates to correct for phase ramp due to frequency offsets.

Figure 12:
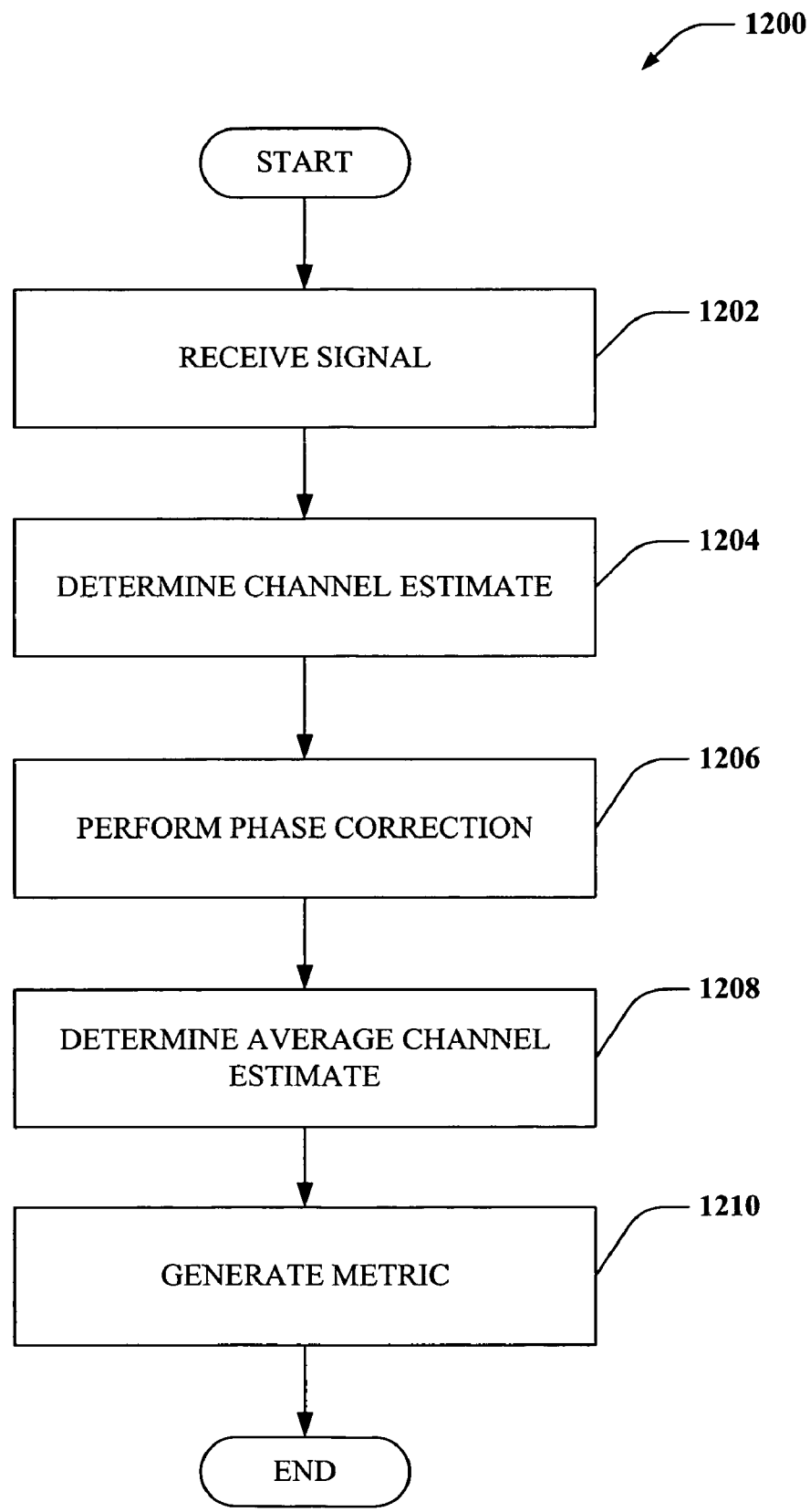
FIG. 12 illustrates a methodology for evaluating a transmitter using phase correction in accordance with one or more aspects presented herein.

Referring now to FIG. 12, a methodology 1200 for evaluating a transmitter using phase correction is illustrated. At 1202, the signal is received from the transmitter. Channel estimates for subcarriers can be determined at 1204. The channel estimates can be determined using known symbols, as illustrated in FIG. 6, or unknown symbols, as illustrated in FIG. 7. At 1206, phase correction can be performed. After phase correction, the average channel estimate can be determined at 1208. A metric for evaluating transmitter performance can be generated at 1210. For example, the MER for the subcarrier can be determined based upon the channel estimate.

Figure 13:
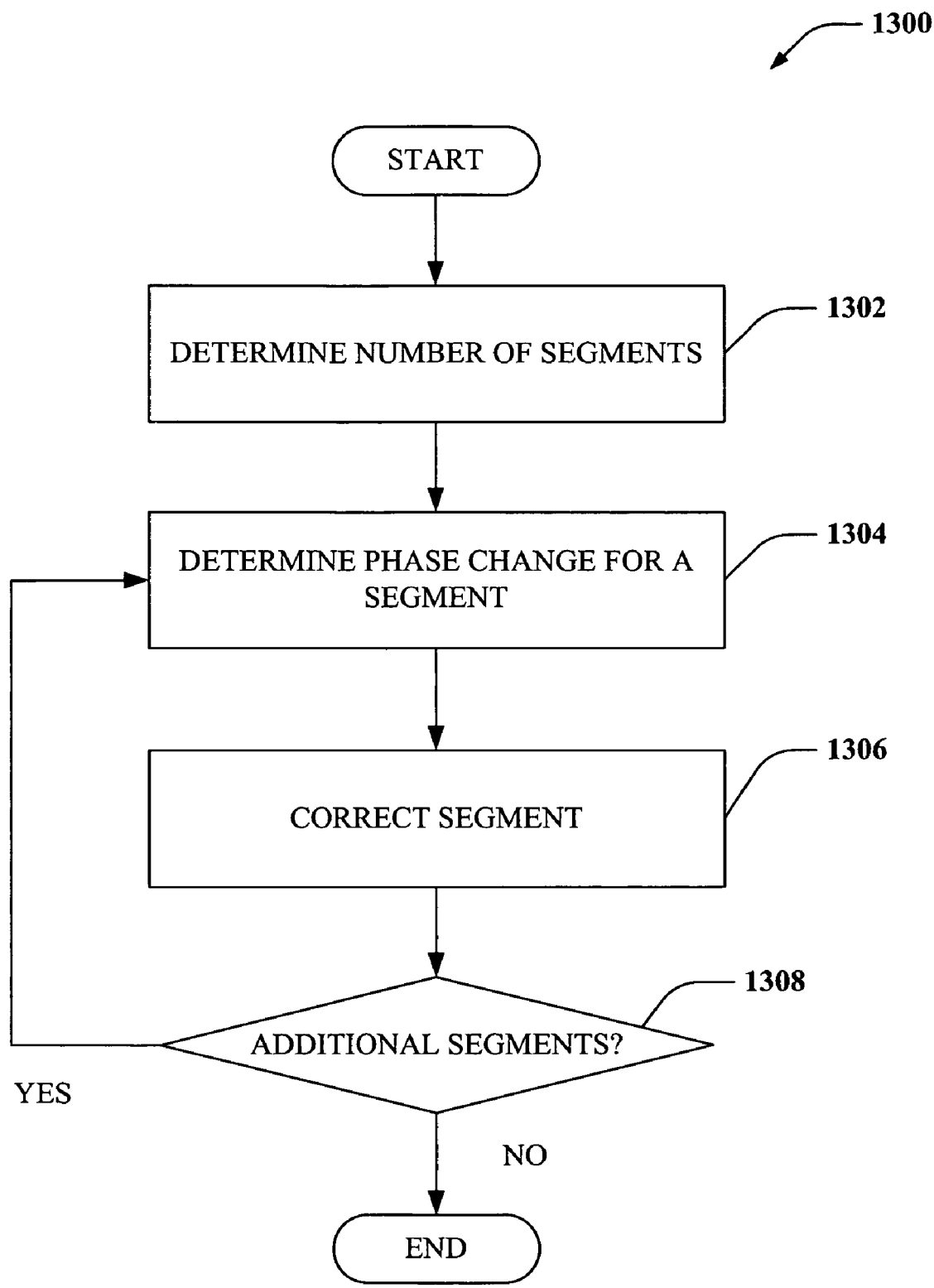
FIG. 13 illustrates a methodology for performing phase correction in accordance with one or more aspect presented herein.

Referring now to FIG. 13, a methodology 1300 for correcting frequency offset is illustrated. The received signal including a frequency offset can be written as follows:

$$r(t) = \sum_{n=0}^{N-1} R_n e^{j(\omega_0 + n\omega_s + \Delta\omega)t}$$

Here $R_n$ is the complex amplitude of the nth subcarrier and N is the total number of subcarriers. The frequency of the initial subcarrier is represented by $\omega_0$, $\omega_s$, represents the subcarrier spacing and $\Delta\omega$ is the frequency offset. A constant frequency offset will result in a linear phase change with time. A frequency offset that varies linearly with time will result in a parabolic phase change over time. Either a constant or linearly changing frequency offset results in a predictable phase change which can be corrected prior to averaging, as shown in FIG. 12.

A linear phase change can be corrected using a first order phase correction algorithm by calculating the slope of phase change. For example, the phase change can be calculated as follows:

$$\frac{d\varphi}{dt} = \frac{1}{T_{OFDM}} \sum_{l=0}^{L} \Delta\varphi_{l+1} = \frac{\varphi_L - \varphi_0}{L}$$

Here, $\Delta\phi_{k+1} = \phi_{k+1} - \phi_k$ is the phase change of the channel estimation between two adjacent OFDM symbols, $\phi_0$ is the phase of the initial channel estimation, L is the number of OFDM symbols and $T_{OFDM}$ is period.

A parabolic phase change can be corrected using a second order phase correction with a LS algorithm to determine the parameters, a, b and c, of the parabolic function. The estimated phase can be written as follows:

$$\phi_{est} = a \cdot t^2 + b \cdot t + c$$

Here, t is time. The estimated phase can be used to correct the estimated channels prior to averaging.

However, the frequency offset is not necessarily constant or linearly varying. Consequently, the phase change is not necessarily linear or parabolic and predictable. One possible solution for correcting for a variable frequency offset includes separating the time duration into segments and then estimating the phase change for each segment. As a result, the estimated noise variance $B_k$ in $MER_k$ equation described with respect to FIG. 6 should be modified as follows:

$$B_k = \frac{2}{2L - N - 1} \sum_{l=1}^{L} W_{k,l}^2$$

Here, N is the number of segments.

The noise term for each channel of each OFDM symbol derived from the received signal can be decomposed into two orthogonal dimensions: amplitude dimension and phase dimension. The noise term in the amplitude dimension can be considered additive white Gaussian noise. The noise term in the phase direction can be considered the sum of the additive white Gaussian noise (AWGN) and the distortion that comes from the frequency offset. The distortion caused by the frequency offset should be eliminated. However, the component of AWGN in the phase dimension should be maintained.

As shown in the methodology 1300 illustrated in FIG. 13, at 1302 the number of segments into which the time will be divided is determined. At 1304 the phase change due to frequency offset is estimated for a segment. The segment is corrected using either a first or second order correction algorithm at 1306. At 1308 a determination is made as to whether there are additional segments to correct. If yes, the process returns to 1304 to determine the phase correction for the next segment. If no, the process terminates.

In one extreme case, if the variance of the noise in the amplitude dimension is equal to that of the variance of the noise in the phase dimension, maximum number of segments is equal to the number of OFDM symbols being processed. Consequently, the noise in the phase dimension will be eliminated as well as the distortion due to frequency offset. As a result, the true value of MER, which includes the noise in the phase dimension, will be equal to the value of the generated MER minus a constant (e.g., 3.01 dB).

It will be appreciated that, in accordance with one or more embodiments described herein, inferences can be made regarding transmission formats, frequencies, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding the number of segments to utilize for phase correction. In addition, inferences can be made regarding the data and format to display to a user.

Figure 14:
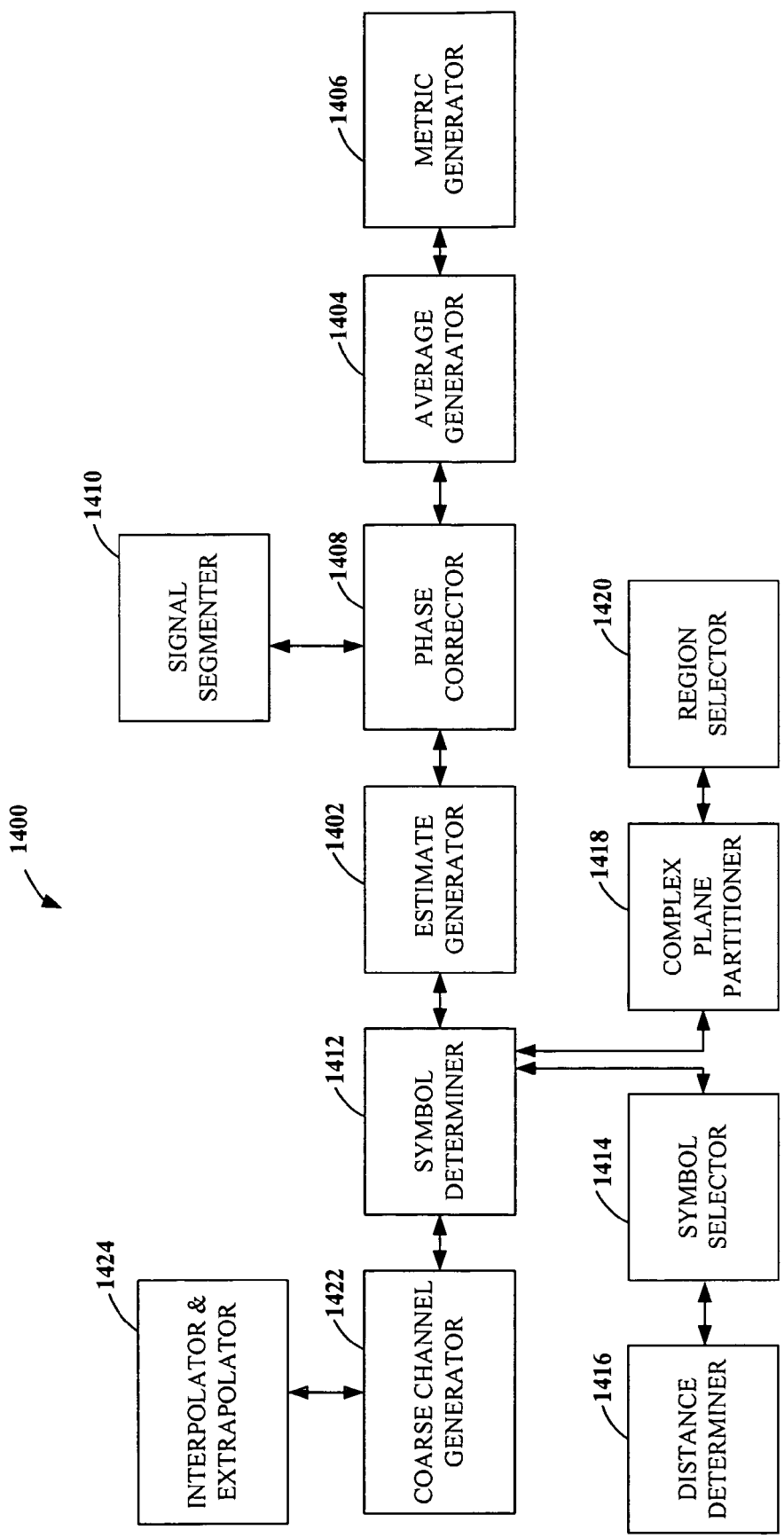
FIG. 14 is an illustration of a system that evaluates transmitter performance in a wireless communication environment in accordance with various aspects presented herein.

Referring now to FIG. 14, a system 1400 for evaluating transmitter performance in a wireless communication environment in accordance with one or more aspects presented herein is illustrated. System 1400 includes a channel estimate generator 1402 that generates frequency domain channel estimates for subcarriers, an average generator 1404 that calculates the average channel estimate for a subcarrier and a metric generator 1406 that generates a metric, such as MER, used to evaluate transmitter performance. System 1400 can also include a phase corrector 1408 that corrects for phase ramp caused by frequency offset. The signal may be separated into segments by a signal segmenter 1410 for phase correction. In addition, system 1400 can include a symbol determiner 1412 that determines modulation symbols for the subcarriers. The symbols may be selected by a symbol selector 1414 based upon the distance between the received signal and modulation symbols in a complex plane as determined by a distance determiner 1416. Alternatively, the complex plane can be partitioned into regions by a complex plane partitioner 1418 and the region in which the received signal is located can be selected by a region selector 1420 and used to determine the symbol. Furthermore, system 1400 can include a coarse channel generator 1422 that generates coarse channel estimates. An interpolator and extrapolator 1424 can be used to generate the coarse channel estimates.

Figure 15:
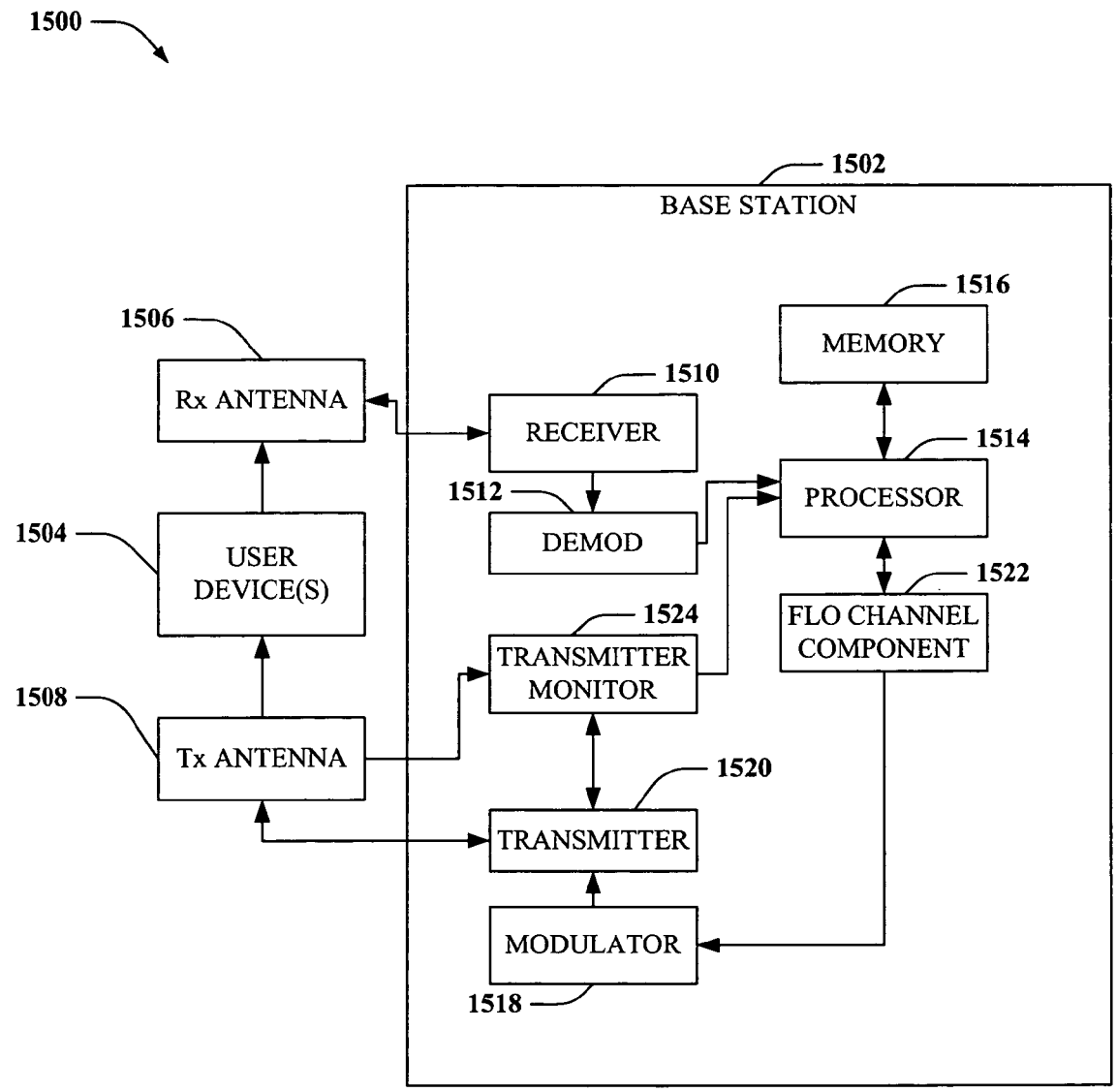
FIG. 15 is an illustration of a system that monitors transmitter performance in a wireless communication environment in accordance with various aspects presented herein.

FIG. 15 is an illustration of a system 1500 that provides for monitoring transmitter performance in a communication environment. System 1500 comprises a base station 1502 with a receiver 1510 that receives signal(s) from one or more user devices 1504 via one or more receive antennas 1506, and transmits to the one or more user devices 1504 through one or more transmit antennas 1508. In one or more embodiments, receive antennas 1506 and transmit antennas 1508 can be implemented using a single set of antennas. Receiver 1510 can receive information from receive antennas 1506 and is operatively associated with a demodulator 1512 that demodulates received information. Receiver 1510 can be, for example, a Rake receiver (e.g., a technique that individually processes multi-path signal components using a plurality of baseband correlators, ...), an MMSE-based receiver, or some other suitable receiver for separating out user devices assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 1514. Processor 1514 can be a processor dedicated to analyzing information received by receiver component 1514 and/or generating information for transmission by a transmitter 1514. Processor 1514 can be a processor that controls one or more components of base station 1502, and/or a processor that analyzes information received by receiver 1510, generates information for transmission by a transmitter 1520, and controls one or more components of base station 1502. Receiver output for each antenna can be jointly processed by receiver 1510 and/or processor 1514. A modulator 1518 can multiplex the signal for transmission by a transmitter 1520 through transmit antennas 1508 to user devices 1504. Processor 1514 can be coupled to a FLO channel component 1522 that can facilitate processing FLO information associated with one or more respective user devices 1504.

Base station 1502 can also include a transmitter monitor 1524. Transmitter monitor 1524 can sample transmitter output and/or transmitter antenna output and evaluate the performance of transmitter 1520. Transmitter monitor 1524 can be coupled to processor 1514. Alternatively, transmitter monitor 1524 can include a separate processor for processing transmitter output. In addition, transmitter monitor 1524 may be independent of base station 1502.

Base station 1502 can additionally comprise memory 1516 that is operatively coupled to processor 1514 and that can store information related to constellation regions and/or any other suitable information related to performing the various actions and functions set forth herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1516 of the subject systems and methods is intended to comprise, without being limited to, these and any other suitable types of memory.

Figure 16:
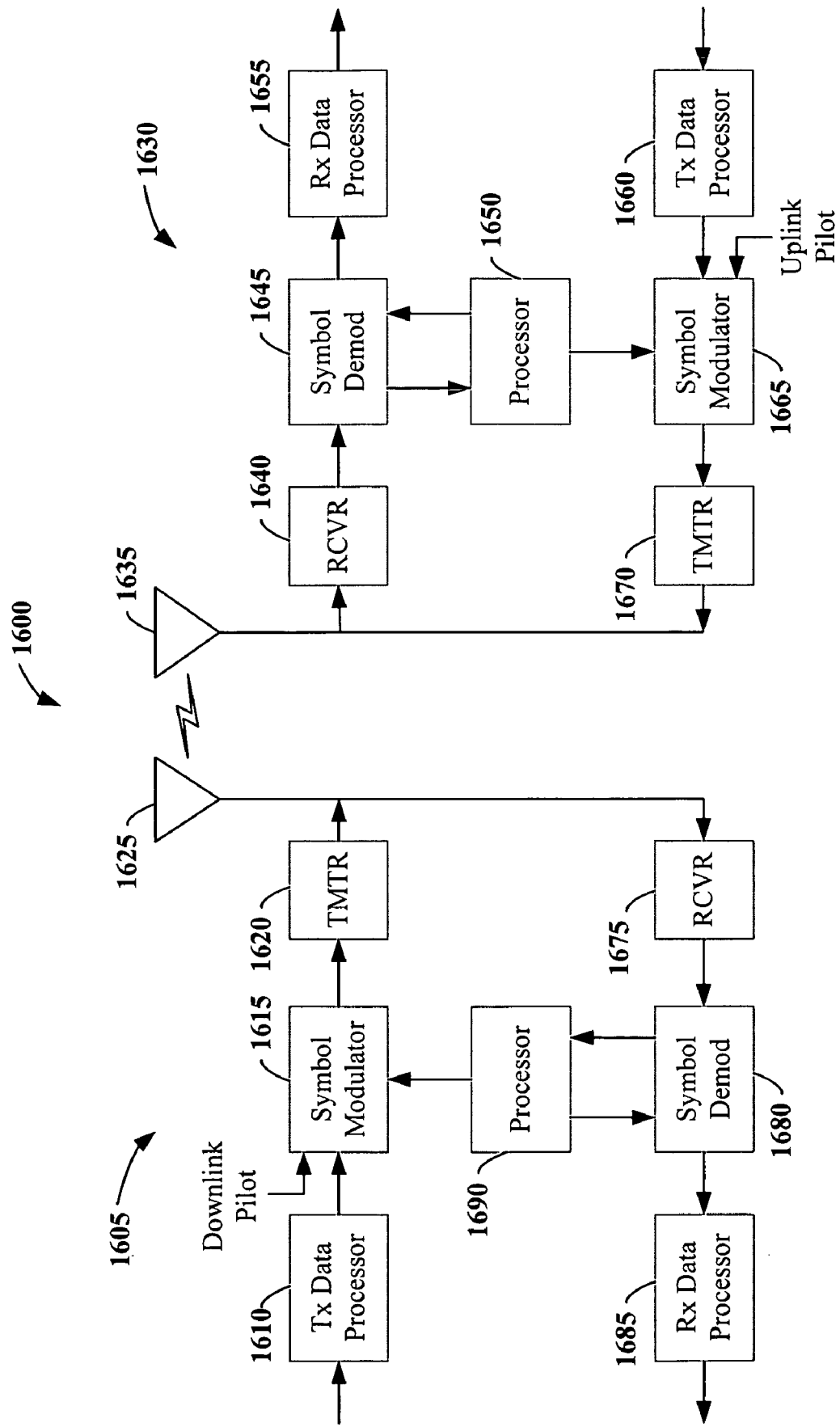
FIG. 16 is an illustration of a wireless communication environment that can be employed in conjunction with the various systems and methods described herein.

FIG. 16 shows an exemplary wireless communication system 1600. The wireless communication system 1600 depicts one base station and one user device for sake of brevity. However, it is to be appreciated that the system can include more than one base station and/or more than one user device, wherein additional base stations and/or user devices can be substantially similar or different from the exemplary base station and user device described below. In addition, it is to be appreciated that the base station and/or the user device can employ the systems (FIGS. 1, 3-4 and 14-15) and/or methods (FIGS. 6-10 and 12-13) described herein.

Referring now to FIG. 16, on a downlink, at access point 1605, a transmit (TX) data processor 1610 receives, formats, codes, interleaves, and modulates (or symbol maps) traffic data and provides modulation symbols ("data symbols"). A symbol modulator 1615 receives and processes the data symbols and pilot symbols and provides a stream of symbols. Symbol modulator 1615 multiplexes data and pilot symbols and provides them to a transmitter unit (TMTR) 1620. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1620 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1625 to the user devices. At user device 1630, an antenna 1635 receives the downlink signal and provides a received signal to a receiver unit (RCVR) 1640. Receiver unit 1640 conditions (e.g., filters, amplifies, and frequency downconverts) the received signal and digitizes the conditioned signal to obtain samples. A symbol demodulator 1645 demodulates and provides received pilot symbols to a processor 1650 for channel estimation. Symbol demodulator 1645 further receives a frequency response estimate for the downlink from processor 1650, performs data demodulation on the received data symbols to obtain data symbol estimates (which are estimates of the transmitted data symbols), and provides the data symbol estimates to an RX data processor 1655, which demodulates (i.e., symbol demaps), deinterleaves, and decodes the data symbol estimates to recover the transmitted traffic data. The processing by symbol demodulator 1645 and RX data processor 1655 is complementary to the processing by symbol modulator 1615 and TX data processor 1610, respectively, at access point 1605.

On the uplink, a TX data processor 1660 processes traffic data and provides data symbols. A symbol modulator 1665 receives and multiplexes the data symbols with pilot symbols, performs modulation, and provides a stream of symbols. A transmitter unit 1670 then receives and processes the stream of symbols to generate an uplink signal, which is transmitted by the antenna 1635 to the access point 1605.

At access point 1605, the uplink signal from user device 1630 is received by the antenna 1625 and processed by a receiver unit 1675 to obtain samples. A symbol demodulator 1680 then processes the samples and provides received pilot symbols and data symbol estimates for the uplink. An RX data processor 1685 processes the data symbol estimates to recover the traffic data transmitted by user device 1630. A processor 1690 performs channel estimation for each active user device transmitting on the uplink. Multiple user devices may transmit pilot concurrently on the uplink on their respective assigned sets of pilot subcarriers, where the pilot subcarrier sets may be interlaced.

Processors 1690 and 1650 direct (e.g., control, coordinate, manage, etc.) operation at access point 1605 and user device 1630, respectively. Respective processors 1690 and 1650 can be associated with memory units (not shown) that store program codes and data. Processors 1690 and 1650 can utilize any of the methodologies described herein. Respective Processors 1690 and 1650 can also perform computations to derive frequency and impulse response estimates for the uplink and downlink, respectively.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of evaluating transmitter performance for a wireless communication environment comprising:
  generating a frequency domain channel estimate for each of a plurality of subcarriers of a transmitter signal;
  determining an average frequency domain channel estimate for each of the plurality of subcarriers, wherein the average frequency domain channel estimate for a specific subcarrier comprises an average of the frequency domain channel estimate for the specific subcarrier over at least one subcarrier frame; and generating at least one metric indicative of transmitter performance based at least in part upon the average frequency domain channel estimate for each of the plurality of subcarriers.

2. The method of claim 1, further comprising:
sampling an analog signal from a transmitter to generate the transmitter signal.

3. The method of claim 2, further comprising:
correcting the transmitter signal for power amplification nonlinearity caused by sampling the analog signal of the transmitter after power amplification.

4. The method of claim 1, further comprising:
determining a modulation symbol for each of the plurality of subcarriers, the modulation symbol is utilized in generating the frequency domain channel estimates and the at least one metric.

5. The method of claim 4, determining the modulation symbol for each of the plurality of subcarriers further comprising:
determining a distance between a point in a complex plane corresponding to the transmitter signal for one of the plurality of subcarriers and a point in the complex plane corresponding to a possible modulation symbol for at least one possible modulation symbol; and
selecting the possible modulation symbol corresponding to the modulation symbol point closest to the signal point, the modulation symbol for the one of the plurality of subcarriers is the selected modulation symbol.

6. The method of claim 4, determining a modulation symbol for each of the plurality of subcarriers further comprising:
partitioning a complex plane into a plurality of regions, each region corresponding to a possible modulation symbol; and
selecting a region in which a point representing the transmitter signal for one of the plurality of subcarriers is located, the modulation symbol for the one of the plurality of subcarriers is the possible modulation symbol corresponding to the selected region.

7. The method of claim 4, further comprising:
determining a modulation type based on a majority vote for a subset of the plurality of subcarriers that has a consistent modulation type; and
reevaluating the modulation symbol for each subcarrier of the subset of the plurality of subcarriers if the modulation symbol of the subcarrier is inconsistent with the majority modulation type.

8. The method of claim 4, further comprising:
generating a coarse frequency domain channel estimate for each of the plurality of subcarriers.

9. The method of claim 8, generating a coarse channel estimate for each of the plurality of subcarriers further comprising:
generating a coarse frequency domain channel estimate for each pilot subcarrier of the plurality of subcarriers;
interpolating a coarse frequency domain channel estimate for each of the plurality of subcarriers located between the pilot subcarners; and
extrapolating a coarse frequency domain channel estimate for each of the plurality of subcarriers not located between the pilot subcarriers.

10. The method of claim 8, the average frequency domain channel estimate is based at least in part upon the coarse frequency domain channel estimates for the plurality of subcarriers.

11. The method of claim 1, further comprising:
generating a graphic user interface (GUI) for presenting a user with the at least one metric.

12. The method of claim 1, further comprising:
generating an alert if the value of the at least one metric is outside of a predetermined range of values.

13. The method of claim 1, further comprising:
performing phase correction on the frequency domain channel estimates.

14. The method of claim 13, performing phase correction further comprises:
performing first order phase correction using the slope of the phase change; and
performing second order phase correction with an LS algorithm.

15. The method of claim 13, performing phase correction further comprises:
separating the transmitter signal into a set of segments, each segment includes at least one symbol; and
performing phase correction for each segment.

16. The method of claim 1, the at least one metric includes at least one of modulation error ratio (MER), noise variance, channel frequency response and group delay.

17. The method of claim 1, the transmitter signal is a forward link only (FLO) signal.

18. The method of claim 1, the transmitter signal is at least one of digital multimedia broadcasting (DMB), digital video broadcasting (DVB), DVB-H, DVB-T, DVB-S, DVB-S2 signal.

19. An apparatus that facilitates evaluating transmitter performance in a wireless communication environment comprising:
a signal analyzer that samples an RF signal from a transmitter;
a processor that calculates a frequency domain channel estimate for each of a plurality of subcarriers for every symbol in a superframe of a transmitter signal, calculates the average of the frequency domain channel estimates for each of the plurality of subcarriers and generates at least one transmitter metric based at least in part upon the average frequency domain channel estimates; and
a memory, coupled to the processor, that stores information related to the symbols;
wherein calculating the average of the frequency domain channel estimates for a specific subcarrier comprises averaging the frequency domain channel estimate for the specific subcarrier over the superframe.

20. The apparatus of claim 19, the processor determines a modulation symbol for each of the plurality of subcarriers, the modulation symbol is utilized in generating the frequency domain channel estimates and the at least one metric.

21. The apparatus of claim 20, the processor determines a modulation type based on a majority vote for a subset of the plurality of subcarriers that has a consistent modulation type and reevaluates the modulation symbol for each subcarrier in the subset of the plurality of subcarriers if the modulation symbol of the subcarrier is inconsistent with the modulation type.

22. The apparatus of claim 20, the processor determines a difference between a point in a constellation diagram corresponding to the transmitter signal for one of the plurality of subcarriers and a point in the constellation diagram corresponding to a possible modulation symbol for at least one possible modulation symbol and selects the possible modulation symbol of the modulation symbol constellation point closest to the signal constellation point, the modulation symbol for the one of the plurality of subcarriers is the selected modulation symbol.

23. The apparatus of claim 20, the memory stores a plurality of regions of a constellation diagram, each region corresponding to a possible modulation symbol and the processor selects a region in which a constellation point corresponding to the transmitter signal is located for each of the plurality of subcarriers, the modulation symbol for the one of the plurality of subcarriers is the possible modulation symbol corresponding to the selected region.

24. The apparatus of claim 19, the processor generates a coarse channel estimate for each pilot subcarrier of the plurality of subcarriers, performs linear interpolation to generate the coarse channel estimate for each of the plurality of subcarriers located between the pilot subcarriers and performs linear extrapolation to generate the coarse channel estimate for each of the plurality of subcarriers not located between the pilot subcarriers.

25. The apparatus of claim 19, further comprising a display component that provides a user with a graphic user interface (GUI) to view the at least one metric.

26. The apparatus of claim 19, the processor divides the transmitter signal into at least one segment including at least one symbol and performs phase correction for each segment.

27. The apparatus of claim 19, the at least one metric includes at least one of modulation error ratio (MER), noise variance, channel frequency response and group delay.

28. A wireless communication apparatus, comprising:
means for generating a frequency domain channel estimate for each of a plurality of subcarriers for every symbol in a unit of data of a transmitter signal;
means for determining an average frequency domain channel estimate for each of the plurality of subcarriers, wherein the average frequency domain channel estimate for a specific subcarrier comprises an average of the frequency domain channel estimate for the specific subcarrier over at least one subcarrier frame; and
means for generating at least one metric indicative of transmitter performance based at least in part upon the average frequency domain channel estimate for each of the plurality of subcarriers.

29. The apparatus of claim 28, further comprising:
means for determining a modulation symbol for each of the plurality of subcarriers, the modulation symbol is utilized in generating the frequency domain channel estimates and the at least one metric.

30. The apparatus of claim 29, further comprising:
means for determining a modulation type based on a majority vote for a subset of the plurality of subcarriers that has a consistent modulation type; and
means for reevaluating the modulation symbol for each subcarrier in the subset of the plurality of subcarriers if the modulation symbol of the subcarrier is inconsistent with the modulation type.

31. The apparatus of claim 29, means for determining a modulation symbol further comprising:
means for determining a distance between a point in a complex plane corresponding to the transmitter signal for one of the plurality of subcarriers and a point in the complex plane corresponding to a possible modulation symbol for at least one possible modulation symbol; and
means for selecting the possible modulation symbol corresponding to the modulation symbol point closest to the signal point, the modulation symbol for the one of the plurality of subcarriers is the selected modulation symbol.

32. The apparatus of claim 29, means for determining a modulation symbol further comprising:

means for partitioning a complex plane into a plurality of regions, each region corresponding to a possible modulation symbol; and
means for selecting a region in which a point corresponding to the transmitter signal for one of the plurality of subcarriers is located, the modulation symbol for the one of the plurality of subcarriers is the possible modulation symbol corresponding to the selected region.

33. The apparatus of claim 28, further comprising:
means for generating a coarse channel estimate for each pilot subcarrier of the plurality of subcarriers; and
means for performing linear interpolation to generate the coarse channel estimate for each of the plurality of subcarriers located between the pilot subcarriers and linear extrapolation to generate the coarse channel estimate for each of the plurality of subcarriers not located between the pilot subcarriers.

34. The apparatus of claim 28, further comprising:
means for separating the transmitter signal into a set of segments, each segment including at least one symbol; and
means for performing phase correction for each segment.

35. A computer-readable medium having stored thereon computer-executable instructions configured for execution using a computing device for:
generating a frequency domain channel estimate for each of a plurality of subcarriers for every symbol in a unit of data of a transmitter signal;
determining an average frequency domain channel estimate for each of the plurality of subcarriers, wherein the average frequency domain channel estimate for a specific subcarrier comprises an average of the frequency domain channel estimate for the specific subcarrier over at least one subcarrier frame; and
generating at least one metric indicative of transmitter performance based at least in part upon the average frequency domain channel estimate for each of the plurality of subcarriers.

36. The computer-readable medium of claim 35, further comprising instructions for:
determining a modulation symbol for each of the plurality of subcarriers, the modulation symbol is utilized in generating the frequency domain channel estimates and the at least one metric.

37. The computer-readable medium of claim 36, further comprising instructions for:
determining a modulation type based on a majority vote for a subset of the plurality of subcarriers that have a consistent modulation type; and
reevaluating the modulation symbol for each subcarrier in the subset of the plurality of subcarriers if the modulation symbol of the subcarrier is inconsistent with the modulation type.

38. The computer-readable medium of claim 36, further comprising instructions for:
determining a distance between a point in a complex plane corresponding to the transmitter signal for one of the plurality of subcarriers and a point in the complex plane corresponding to a possible modulation symbol for at least one possible modulation symbol; and
selecting the possible modulation symbol corresponding to the modulation symbol point closest to the signal point, the modulation symbol for the one of the plurality of subcarriers is the selected modulation symbol.

39. The computer-readable medium of claim 36, further comprising instructions for:

partitioning a complex plane into a plurality of regions, each region corresponding to a possible modulation symbol; and selecting a region in which a point corresponding to the transmitter signal for one of the plurality of subcarriers is located, the modulation symbol for the one of the plurality of subcarriers is the possible modulation symbol corresponding to the selected region.

40. The computer-readable medium of claim 35, further comprising instructions for:

generating a coarse frequency domain channel estimate for each pilot subcarrier of the plurality of subcarriers;

interpolating a coarse frequency domain channel estimate for each of the plurality of subcarriers located between the pilot subcarriers; and extrapolating a coarse frequency domain channel estimate for each of the plurality of subcarriers not located between the pilot subcarriers.

41. The computer-readable medium of claim 35, further comprising instructions for:

generating a graphic user interface (GUI) for presenting a user with the at least one metric.

42. The computer-readable medium of claim 35, further comprising instructions for:

separating the transmitter signal into a set of segments, each segment including at least one symbol; and performing phase correction for each segment.

43. The computer-readable medium of claim 35, the at least one metric includes at least one of modulation error ratio (MER), noise variance, channel frequency response and group delay.

44. A processor the configured to execute instructions for evaluating transmitter performance in a wireless communication environment, the instructions comprising:

generating a frequency domain channel estimate for each of a plurality of subcarriers for every symbol in a unit of data of a transmitter signal;

determining an average frequency domain channel estimate for each of the plurality of subcarriers, wherein the average frequency domain channel estimate for a specific subcarrier comprises an average of the frequency domain channel estimate for the specific subcarrier over at least one subcarrier frame; and generating at least one metric indicative of transmitter performance based at least in part upon the average frequency domain channel estimate for each of the plurality of subcarriers.

45. The processor of claim 44, the instructions further comprising:

determining a modulation symbol for each of the plurality of subcarriers, the modulation symbol is utilized in generating the frequency domain channel estimates and the at least one metric.

46. The processor of claim 45, the instructions further comprising:

determining a modulation type based on a majority vote for a subset of the plurality of subcarriers that has a consistent modulation type; and reevaluating the modulation symbol for each subcarrier in the subset of the plurality of subcarriers if the modulation symbol of the subcarrier is inconsistent with the modulation type.

47. The processor of claim 45, the instructions further comprising:

determining a distance between a point in a complex plane corresponding to the transmitter signal for one of the plurality of subcarriers and a point in the complex plane corresponding to a possible modulation symbol for at least one possible modulation symbol; and selecting the possible modulation symbol corresponding to the modulation symbol point closest to the signal point, the modulation symbol for the one of the plurality of subcarriers is the selected modulation symbol.

48. The processor of claim 45, the instructions further comprising:

partitioning a complex plane into a plurality of regions, each region corresponding to a possible modulation symbol; and selecting a region in which a point in a complex plane corresponding to the transmitter signal for one of the plurality of subcarriers is located, the modulation symbol for the one of the plurality of subcarriers is the possible modulation symbol corresponding to the selected region.

49. The processor of claim 44, the instructions further comprising:

generating a coarse frequency domain channel estimate for each pilot subcarrier of the plurality of subcarriers;

interpolating a coarse frequency domain channel estimate for each of the plurality of subcarriers located between the pilot subcarriers; and extrapolating a coarse frequency domain channel estimate for each of the plurality of subcarriers not located between the pilot subcarriers.

50. The processor of claim 44, the instructions further comprising:

generating a graphic user interface (GUI) for presenting a user with the at least one metric.

51. The processor of claim 44, the instructions further comprising:

separating the transmitter signal into a set of segments, each segment including at least one symbol; and performing phase correction for each segment.

52. The processor of claim 44, the at least one metric includes at least one of modulation error ratio (MER), noise variance, channel frequency response and group delay.

* * * * *